US012242391B2

(12) United States Patent
Rozas et al.

(10) Patent No.: US 12,242,391 B2
(45) Date of Patent: *Mar. 4, 2025

(54) PROCESSORS, METHODS, SYSTEMS, AND INSTRUCTIONS TO SUPPORT LIVE MIGRATION OF PROTECTED CONTAINERS

(71) Applicant: Intel Corporation, Santa Clara, CA (US)

(72) Inventors: Carlos V. Rozas, Portland, OR (US); Mona Vij, Hillsboro, OR (US); Rebekah M. Leslie-Hurd, Portland, OR (US); Krystof C. Zmudzinski, Forest Grove, OR (US); Somnath Chakrabarti, Portland, OR (US); Francis X. McKeen, Portland, OR (US); Vincent R. Scarlata, Beaverton, OR (US); Simon P. Johnson, Beaverton, OR (US); Ilya Alexandrovich, Yokneam Illit (IL); Gilbert Neiger, Portland, OR (US); Vedvyas Shanbhogue, Austin, TX (US); Ittai Anati, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,124

(22) Filed: Oct. 9, 2023

(65) Prior Publication Data
US 2024/0184717 A1 Jun. 6, 2024

Related U.S. Application Data

(63) Continuation of application No. 17/367,349, filed on Jul. 3, 2021, now Pat. No. 11,782,849, which is a (Continued)

(51) Int. Cl.
G06F 12/14 (2006.01)
G06F 8/41 (2018.01)
(Continued)

(52) U.S. Cl.
CPC .......... G06F 12/1408 (2013.01); G06F 8/41 (2013.01); G06F 9/30145 (2013.01);
(Continued)

(58) Field of Classification Search
CPC .... G06F 12/1408; G06F 8/41; G06F 9/30145; G06F 9/45558; G06F 12/1441;
(Continued)

(56) References Cited

U.S. PATENT DOCUMENTS 8,285,958 B1  10/2012 Sallam
8,972,746 B2   3/2015 Johnson et al.
(Continued)

FOREIGN PATENT DOCUMENTS

CN   1314653 A    9/2001
CN   101114471 A  1/2008
(Continued)

OTHER PUBLICATIONS

Allowance Decision of Examination, TW App. No. 105115540, Oct. 21, 2020, 3 pages (1 page of English Translation and 2 pages of Original Document).
(Continued)

Primary Examiner — Mohammad W Reza
(74) Attorney, Agent, or Firm — Nicholson De Vos Webster & Elliott LLP

(57) ABSTRACT

A processor includes a decode unit to decode an instruction that is to indicate a page of a protected container memory, and a storage location outside of the protected container memory. An execution unit, in response to the instruction, is to ensure that there are no writable references to the page of
(Continued)

the protected container memory while it has a write protected state. The execution unit is to encrypt a copy of the page of the protected container memory. The execution unit is to store the encrypted copy of the page to the storage location outside of the protected container memory, after it has been ensured that there are no writable references. The execution unit is to leave the page of the protected container memory in the write protected state, which is also valid and readable, after the encrypted copy has been stored to the storage location.

21 Claims, 16 Drawing Sheets

Related U.S. Application Data continuation of application No. 16/729,251, filed on Dec. 27, 2019, now Pat. No. 11,055,236, which is a continuation of application No. 15/651,771, filed on Jul. 17, 2017, now Pat. No. 10,558,588, which is a continuation of application No. 14/752,227, filed on Jun. 26, 2015, now Pat. No. 9,710,401.

(51) Int. Cl.
  G06F 9/30        (2018.01)
  G06F 9/455       (2018.01)
  G06F 21/53       (2013.01)
  G06F 21/60       (2013.01)

(52) U.S. Cl.
  CPC ...... G06F 9/45558 (2013.01); G06F 12/1441 (2013.01); G06F 12/1483 (2013.01); G06F 21/53 (2013.01); G06F 21/602 (2013.01); G06F 2009/4557 (2013.01); G06F 2009/45587 (2013.01); G06F 2212/1052 (2013.01)

(58) Field of Classification Search
  CPC .... G06F 12/1483; G06F 21/53; G06F 21/602; G06F 2009/4557; G06F 2009/45587; G06F 2212/1052
  See application file for complete search history.

(56) References Cited

U.S. PATENT DOCUMENTS

| | | | |
|---|---|---|---|
| 9,355,262 | B2 | 5/2016 | Leslie-Hurd et al. |
| 9,703,715 | B2 | 7/2017 | Goldsmith et al. |
| 9,710,401 | B2 | 7/2017 | Rozas et al. |
| 9,710,622 | B2 | 7/2017 | Pandey et al. |
| 9,747,102 | B2 | 8/2017 | Leslie et al. |
| 9,767,044 | B2 | 9/2017 | Chhabra et al. |
| 9,792,448 | B2 | 10/2017 | Kaplan et al. |
| 9,904,632 | B2 | 2/2018 | Johnson et al. |
| 9,942,035 | B2 | 4/2018 | Rozas et al. |
| 10,152,602 | B2 | 12/2018 | Kaplan et al. |
| 10,176,122 | B2 | 1/2019 | Kaplan et al. |
| 2005/0114688 | A1 | 5/2005 | Leis et al. |
| 2007/0233955 | A1 | 10/2007 | Luo et al. |
| 2008/0052444 | A1 | 2/2008 | Hwang et al. |
| 2009/0172256 | A1 | 7/2009 | Chu et al. |
| 2009/0222675 | A1 | 9/2009 | Lange et al. |
| 2009/0292522 | A1 | 11/2009 | Maeda |
| 2011/0085657 | A1 | 4/2011 | Matthews, Jr. |
| 2011/0202916 | A1 | 8/2011 | Voba et al. |
| 2012/0042034 | A1 | 2/2012 | Goggin et al. |
| 2012/0084520 | A1 | 4/2012 | Chou et al. |
| 2012/0159184 | A1 | 6/2012 | Johnson et al. |
| 2013/0159726 | A1 | 6/2013 | McKeen et al. |
| 2013/0198853 | A1 | 8/2013 | McKeen et al. |
| 2013/0232344 | A1 | 9/2013 | Johnson et al. |
| 2014/0089923 | A1 | 3/2014 | Fultheim et al. |
| 2014/0157410 | A1 | 6/2014 | Dewan et al. |
| 2014/0173275 | A1 | 6/2014 | Johnson et al. |
| 2014/0189242 | A1 | 7/2014 | McKeen et al. |
| 2014/0189246 | A1 | 7/2014 | Xing et al. |
| 2014/0189325 | A1 | 7/2014 | McKeen et al. |
| 2014/0189326 | A1 | 7/2014 | Leslie et al. |
| 2014/0223197 | A1 | 8/2014 | Gueron et al. |
| 2014/0297962 | A1 | 10/2014 | Rozas et al. |
| 2015/0006968 | A1 | 1/2015 | Shanbhogue et al. |
| 2015/0007172 | A1 | 1/2015 | Hudzia et al. |
| 2015/0033012 | A1 | 1/2015 | Scarlata et al. |
| 2015/0033034 | A1 | 1/2015 | Gerzon et al. |
| 2015/0033316 | A1 | 1/2015 | Scarlata et al. |
| 2015/0088586 | A1 | 3/2015 | Pavlas et al. |
| 2015/0089173 | A1 | 3/2015 | Chhabra et al. |
| 2015/0331715 | A1 | 11/2015 | Sathyanarayana |
| 2016/0180114 | A1 | 6/2016 | Sastry et al. |
| 2016/0378684 | A1 | 12/2016 | Zmudzinski et al. |
| 2016/0378688 | A1 | 12/2016 | Rozas et al. |
| 2017/0054557 | A1 | 2/2017 | Rozas et al. |
| 2017/0083724 | A1 | 3/2017 | Chhabra et al. |
| 2017/0185533 | A1 | 6/2017 | Rozas et al. |
| 2017/0185776 | A1 | 6/2017 | Robinson et al. |
| 2017/0277898 | A1 | 9/2017 | Powell et al. |
| 2018/0024854 | A1 | 1/2018 | Wang et al. |
| 2018/0136971 | A1 | 5/2018 | Dong et al. |
| 2018/0165224 | A1 | 6/2018 | Brown et al. |
| 2018/0246751 | A1 | 8/2018 | Dong et al. |

FOREIGN PATENT DOCUMENTS

| | | |
|---|---|---|
| CN | 104598256 A | 5/2015 |
| TW | 200729232 A | 8/2007 |
| TW | 200929224 A | 7/2009 |
| TW | 201729136 A | 8/2017 |
| TW | 201732584 A | 9/2017 |
| WO | 2012/082410 A2 | 6/2012 |
| WO | 2016/209547 A1 | 12/2016 |
| WO | 2017/030822 A1 | 2/2017 |
| WO | 2017/112908 A1 | 6/2017 |

OTHER PUBLICATIONS

Allowance Decision of Examination, TW App. No. 109134811, Sep. 30, 2021, 3 pages (1 page of English Translation and 2 pages of Original Document).
Anati et al., "Innovative Technology for CPU Based Attestation and Sealing", Intel Corporation, 2013, 7 pages.
Communication pursuant to Article 94(3) EPC, EP App. No. 16814991. 2, Jun. 8, 2020, 5 pages.
Communication pursuant to Article 94(3) EPC, EP App. No. 16814991. 2, Nov. 29, 2019, 5 pages.
Communication pursuant to Article 94(3) EPC, EP App. No. 19209069. 4, Jul. 23, 2020, 5 pages.
Communication pursuant to Article 94(3) EPC, EP App. No. 19209069. 4, Feb. 13, 2020, 5 pages.
Decision to grant a European patent, EP App. No. 16814991.2, Sep. 23, 2021, 2 pages.
European Communication under Rule 71(3) EPC , EP App. No. 16814991.2, May 6, 2021, 6 pages.
Extended European Search Report, EP App. No. 16814991.2, Feb. 12, 2019, 9 pages.
First Office Action, Chinese App. No. 202010877325.3, Oct. 30, 2023, 10 pages (5 pages of English Translation and 5 pages of Original Document).
First Office Action, CN App. No. 201680030029.1, Dec. 28, 2020, 14 pages (7 pages of English Translation and 7 pages of Original Document).
Hoekstra et al., "Using Innovative Instructions to Create Trustworthy Software Solutions", Intel Corporation, 2013, 8 pages.
Hoekstra, Matthew, "Intel(registered) SGX for Dummies (Intel(registered) SGX Design Objectives)", Intel Corporation, Sep. 26, 2013, 8 pages.
Hoekstra, Matthew, "Intel.RTM. SGX for Dummies (Intel.RTM. SGX Design Objectives)", Intel Corporation, Sep. 26, 2013, 8 pages.

(56) References Cited

OTHER PUBLICATIONS

Intel Corporation, "Intel Software Guard Extensions Programming Reference", Document Reference No. 329298-002US, Oct. 2014, 186 pages.
International Preliminary Report on Patentability, PCT App. No. PCT/US2016/034519, Jan. 4, 2018, 10 pages.
International Search Report and Written Opinion, PCT App. No. PCT/US2016/034519, Aug. 24, 2016, 11 pages.
International Search Report with Written Opinion received for PCT Application No. PCT/US2016/034519, Aug. 24, 2016, 11 pages.
McKeen, et al. "Innovative Instructions and Software Model for Isolated Execution", Intel Corporation, 2013, 8 pages.
Non Final Office Action, U.S. Appl. No. 16/729,251, filed Nov. 13, 2020, 6 pages.
Non-Final Office Action, U.S. Appl. No. 14/752,227, filed Sep. 9, 2016, 12 pages.
Non-Final Office Action, U.S. Appl. No. 17/367,349, filed Nov. 10, 2022, 14 pages.
Notice of Allowance, U.S. Appl. No. 14/752,227, filed Mar. 15, 2017, 8 pages.
Notice of Allowance, U.S. Appl. No. 15/651,771, filed Nov. 15, 2019, 8 pages.
Notice of Allowance, U.S. Appl. No. 16/729,251, filed Jun. 10, 2021, 2 pages.
Notice of Allowance, U.S. Appl. No. 16/729,251, filed Mar. 3, 2021, 08 pages.
Notice of Allowance, U.S. Appl. No. 17/367,349, filed Jun. 1, 2023, 8 pages.
Office Action, EP App. No. 19209069.4, Apr. 25, 2021, 05 pages.
Office Action, EP App. No. 19209069.4, Aug. 30, 2022, 6 pages.
Office Action, EP App. No. 19209069.4, Dec. 17, 2021, 5 pages.
Office Action, EP App. No. 19209069.4, Mar. 9, 2023, 6 pages.
Office Action, EP App. No. 19209069.4, Oct. 26, 2023, 6 pages.
Office Action, TW App. No. 105115540, May 29, 2020, 44 pages (21 pages of English Translation and 23 pages of Original Document).
Office Action, TW App. No. 109134811, May 31, 2021, 26 pages (14 pages of English Translation and 12 pages of Office Action).
Rozas et al., "Instructions and Logic to Suspend/Resume Migration of Enclaves in a Secure Enclave Page Cache", U.S. App. No. 14/998,157, filed Dec. 24, 2015, 97 pages.
Rozas et al., "Platform Migration of Secure Enclaves", U.S. Appl. No. 14/829,340, filed Aug. 18, 2015, 56 pages.
Second Office Action, CN App. No. 201680030029.1, Jun. 24, 2021, 7 pages (4 pages of English Translation and 3 pages of Original Document).
Supplemental European Search Report, EP App No. 19209069.4, Jan. 30, 2020, 5 pages.
Wikipedia, Snapshot (computer storage), available online at <https://en.wikipedia.org/w/index.php?title=Snapshot_(computer_storage)&oldid=657002447>, Apr. 18, 2015, 5 pages.
Wikipedia, "Snapshot (Computer Storage)," Apr. 18, 2015, 5 pages.
Office Action, EP App. No. 19209069.4, Jun. 25, 2024, 6 pages.
Notice of Allowance, CN App. No. 202010877325.3, May 30, 2024, 04 pages (2 pages of English Translation and 02 pages of Original Document).

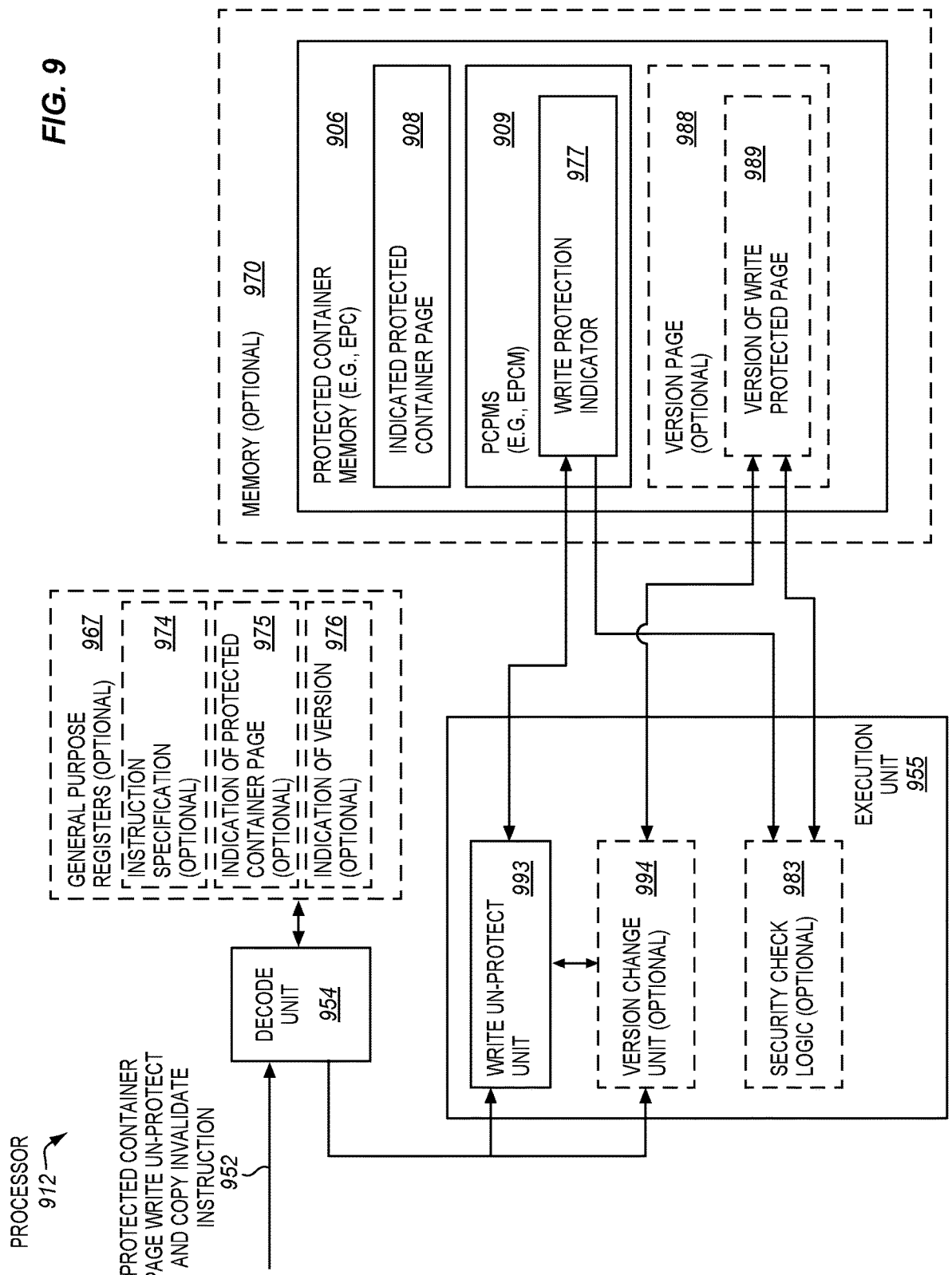

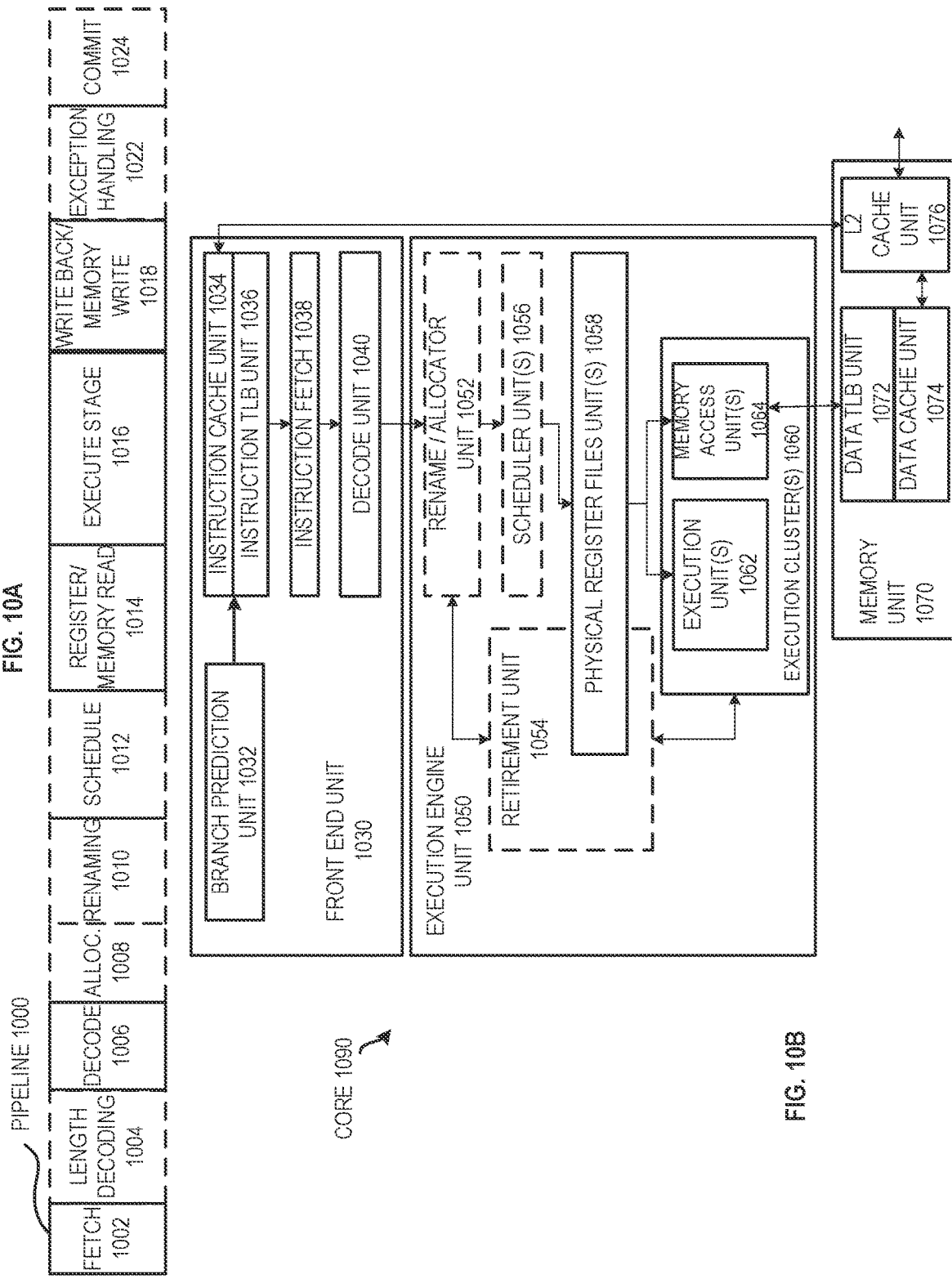

PROCESSORS, METHODS, SYSTEMS, AND INSTRUCTIONS TO SUPPORT LIVE MIGRATION OF PROTECTED CONTAINERS

RELATED APPLICATIONS

The present application is a continuation of U.S. patent application Ser. No. 17/367,349, filed on Jul. 3, 2021, entitled "PROCESSORS, METHODS, SYSTEMS, AND INSTRUCTIONS TO SUPPORT LIVE MIGRATION OF PROTECTED CONTAINERS", which is a continuation of U.S. patent application Ser. No. 16/729,251, filed on Dec. 27, 2019, entitled "PROCESSORS, METHODS, SYSTEMS, AND INSTRUCTIONS TO SUPPORT LIVE MIGRATION OF PROTECTED CONTAINERS", now U.S. Pat. No. 11,055,236, Issued on Jul. 6, 2021, which is a continuation of U.S. patent application Ser. No. 15/651,771, filed on Jul. 17, 2017, entitled "PROCESSORS, METHODS, SYSTEMS, AND INSTRUCTIONS TO SUPPORT LIVE MIGRATION OF PROTECTED CONTAINERS", now U.S. Pat. No. 10,558,588, Issued on Feb. 11, 2020, which is a continuation of U.S. patent application Ser. No. 14/752,227, filed on Jun. 26, 2015, entitled "PROCESSORS, METHODS, SYSTEMS, AND INSTRUCTIONS TO SUPPORT LIVE MIGRATION OF PROTECTED CONTAINERS" now U.S. Pat. No. 9,710,401, Issued on Jul. 18, 2017, which is hereby incorporated herein by reference in its entirety and for all purposes.

BACKGROUND

Technical Field

Embodiments described herein generally relate to processors. In particular, embodiments described herein generally relate to processors having architectures that support enclaves or other protected containers.

Background Information

Desktop computers, laptop computers, smartphones, servers, routers and other network elements, and various other types of computer systems are often used to process secret or confidential information. A few representative examples of such secret or confidential information include, but are not limited to, passwords, account information, financial information, information during financial transactions, confidential company data, enterprise rights management information, personal calendars, personal contacts, medical information, other personal information, and the like. It is generally desirable to protect such secret or confidential information from inspection, tampering, and the like.

BRIEF DESCRIPTION OF THE DRAWINGS

The invention may best be understood by referring to the following description and accompanying drawings that are used to illustrate embodiments. In the drawings:

FIG. 9 is a block diagram of an embodiment of a processor that is operative to perform an embodiment of a protected container page write unprotect and encrypted page copy invalidation instruction.

FIG. 10A is a block diagram illustrating an embodiment of an in-order pipeline and an embodiment of a register renaming out-of-order issue/execution pipeline.

FIG. 10B is a block diagram of an embodiment of processor core including a front end unit coupled to an execution engine unit and both coupled to a memory unit.

DETAILED DESCRIPTION OF EMBODIMENTS

Disclosed herein are instructions that perform operations useful during live migration of protected containers, processors to execute the instructions, methods performed by the processors when processing or executing the instructions, and systems incorporating one or more processors to process or execute the instructions. Although the instructions are mainly described in conjunction with the live migration of protected containers, it is to be appreciated that the instructions are not limited to such uses but rather have general utility and may optionally be used for other uses entirely unrelated to live migration of protected containers. In the following description, numerous specific details are set forth (e.g., specific instruction operations, data structures and contents thereof, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
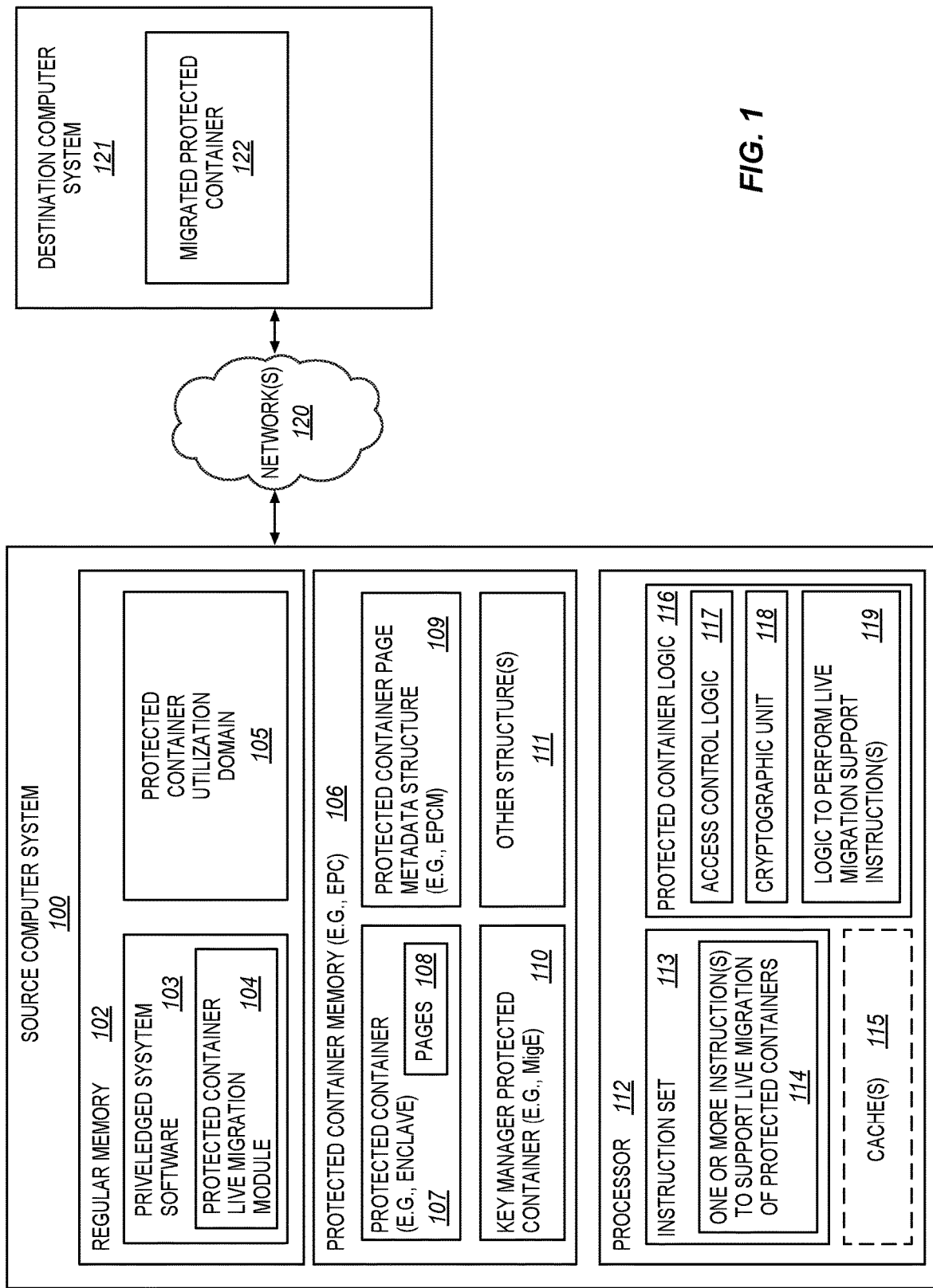
FIG. 1 is a block diagram of a computing environment in which a protected container may be migrated from a source computer system to a destination computer system.

FIG. 1 is a block diagram of a computing environment in which a protected container 107 may be migrated from a source computer system 100 to a destination computer system 121. The source and destination computer systems may represent desktop computer systems, laptop computer systems, smartphones, servers, network elements, or other types of computer systems. As shown, the source and destination computer systems may be coupled, or otherwise in communication with one another, by one or more intervening networks 120. In one aspect, the source and destination computer systems may be coupled over the Internet (e.g., the "cloud"). Alternatively, the source and destination computer systems may be coupled more directly by one or more local wired or wireless links.

The source computer system includes at least one processor 112, a regular memory 102, and a protected container memory 106. The regular memory and the protected container may represent different portions of system memory that may include one or more types of physical memory (e.g., dynamic random access memory (DRAM), flash memory, etc.). The regular and protected container memories may have different levels of protection or security enforced in part by logic of the processor. The regular memory may represent a portion of the system memory of the type commonly used to store applications, data, and the like. As shown, the regular memory may store privileged system software 103 (e.g., a virtual machine monitor, one or more operating systems, etc.). The regular memory may also store one or more user-level applications (e.g., network management applications, database applications, email applications, spreadsheet applications, etc.). In one aspect, the source computer system may represent a so-called "open" system that generally does not significantly restrict user choice with regards to the system software and user-level applications that may be loaded onto the system.

The protected container memory 106 may have a higher level of protection and/or security than the regular memory 102. The higher level of protection and/or security may be enforced, controlled, or otherwise provided at least in part by hardware and/or other on-die logic of the processor. In some embodiments, the protected container memory may represent a portion of processor reserved memory that is reserved exclusively for use by the processor, whereas the regular memory may not be part of the processor reserved memory. By way of example, the processor may have one or more range registers that correspond to the protected container memory. The range registers may be used to store data associated with a range of the protected container memory, and may be consulted upon attempted accesses to the protected container memory as part of providing the protection and/or security. In one aspect, the data or ranges may be stored in the range registers by a basic input/output system (BIOS) during boot.

A protected container 107 (e.g., one or more pages 108 of the protected container) may be stored in the protected container memory 106. The processor may have an instruction set 113 that includes instructions to interact with (e.g., create, destroy, enter, exit, manage paging in, perform security operations on, etc.) the protected container. Some of the instructions may be privileged-level instructions that can be performed by privileged-level software (e.g., software 103) but not by unprivileged or user-level software. Other instructions may be unprivileged or user-level instructions. As one example, the protected container may be created for a protected container utilization domain 105, such as, for example, a virtual machine module, application module, or the like. For example, the privileged system software may create the protected container. The protected container may be generally opaque to the privileged-level software (e.g., the privileged level software may not be able to see the code and/or data within the protected container, yet may be managed by the privileged-level software (e.g., through privileged-level instructions of the instruction set).

The protected container utilization domain may store secret or confidential data in the protected container. The protected container may help to provide confidentiality and in some cases optionally one or more other protections (e.g., integrity protection, replay protection, etc.) to the secret or confidential information in the protected container. Confidentiality generally involves preventing data disclosure. Integrity generally involves ensuring there is no data tampering. At least some hardware logic of the processor may help to provide such confidentiality and/or other protections. In various embodiments, the protected container may represent a secure enclave, hardware enforced container, hardware managed execution environment, hardware managed isolated execution region, secure and/or private memory region to be used by an application, or other protected container. In some embodiments, the protected container may represent an Intel® Software Guard Extensions (Intel® SGX) enclave, although the scope of the invention is not so limited. In some embodiments, the protected container memory may represent an Intel® SGX enclave page cache (EPC) that is operative to store pages of one or more running or executing secure enclave, although the scope of the invention is not so limited.

In some embodiments, a protected container page metadata structure (PCPMS) 109 may be used to store metadata (e.g., security metadata, access control metadata, etc.) for the protected container 107. As shown, in some embodiments, the PCPMS may optionally be stored in the protected container memory, although this is not required. In some embodiments, the PCPMS may store such metadata for each page stored in the protected container memory. In one aspect, the PCPMS may be structured to have different entries for different corresponding pages in the protected container memory, although other ways of structuring the PCPMS are also possible (e.g., other types of tables, data structures, etc.). Each entry may store metadata for the corresponding page. Examples of suitable types of metadata for protected container pages include, but are not limited to, information to indicate whether the page is valid or invalid, information to indicate a protected container to which the protected container page belongs, information to indicate the virtual address through which the protected container page is allowed to be accessed, information to indicate read/write/execute permissions for the protected container page, and the like, and various combinations thereof, depending upon the particular implementation. Alternatively, less metadata, additional metadata, or other combinations of metadata may optionally be stored in different embodiments. The scope of the invention is not limited to any known type of metadata to be stored in the PCPMS. One example of a suitable PCPMS, for some embodiments, is an Intel® SGX enclave page cache map (EPCM), although the scope of the invention is not so limited.

As shown in FIG. 1, the protected container (e.g., the pages thereof) may optionally be stored in the protected container memory. Likewise, the PCPMS may optionally be stored in the protected container memory. In addition, or alternatively, the protected container (e.g., the pages thereof) and/or the PCPMS may optionally be stored in an on-die protected container storage of the processor. For example, the processor may have one or more caches 115 to store the protected container pages and/or the PCPMS. By way of example, one or more dedicated caches may be used, dedicated portions of one or more caches may be used, or a combination thereof. As another option, the processor may have another type of dedicated storage besides caches to store such pages or structures. A combination of both off-die memory and on-die cache(s) or other storage is also suitable.

Referring again to FIG. 1, the processor may also have protected container logic 116. The protected container logic may include hardware, firmware, or a combination thereof, to perform the instructions and/or otherwise support the protected containers (e.g., control accesses to the protected containers). The protected container logic includes access control logic 117. The access control logic may be operative to enforce, control, or otherwise provide access controls for the protected container memory and data of the protected container memory when it is resident on-die of the processor (e.g., in the cache(s), registers, other structures, etc.). Different types of access control logic 117 are suitable in different embodiments, depending upon the particular implementation.

In some embodiments, the access control logic may include a memory management unit (MMU) and/or a page miss handler (PMH) unit that may be operative to control access to the protected container and/or the protected container memory in part by consulting with page tables, range registers, the PCPMS 109, or the like, or a combination thereof, depending upon the particular implementation. In some embodiments, the access control logic may include logic that is operative to control access to code and/or data of the protected container when the code and/or data is resident within the processor. For example, the logic may be operative to control access to the code and/or data when it is stored or otherwise resident in an unencrypted form in caches, registers, and other structures or components within the processor during runtime when used for computation. In one aspect, the logic may be operative to allow authorized accesses to the code and/or data of a protected container (whether it is stored in the protected container memory or is resident on-die of the processor) from code of the same protected container, but may prevent unauthorized accesses to the code and/or data of the protected container (whether it is stored in the protected container memory or is resident on-die of the processor) by code outside of the protected container.

The protected container logic may also include a cryptographic unit 118. The cryptographic unit may be operative to perform encryption and decryption. In some embodiments, the cryptographic unit may automatically encrypt code and/or data of protected containers before the code and/or data is stored out of the processor (e.g., to system memory), such as, for example, during writes to the system memory, eviction of cache lines holding protected container code and/or data, etc. This may help to prevent the code and/or data from being viewed (e.g., help to provide for confidentiality of the data). The cryptographic unit may also be operative to decrypt encrypted code and/or data of enclave pages when they are received into the processor (e.g., from system memory).

In some embodiments, the cryptographic unit may also optionally be operative to cryptographically provide integrity protection and/or authentication to the code and/or data of protected containers. For example, in some embodiments, the cryptographic unit may automatically compute a message authentication code, or other authentication or integrity check data, for code and/or data of protected containers before the code and/or data is stored out of the processor (e.g., to system memory). The cryptographic unit may also optionally be operative to use such authentication or integrity check data to authenticate or ensure the integrity of code and/or data of protected container pages when they are received into the processor (e.g., from system memory). This may help to allow for authentication or integrity checking of the data to help detect any tampering or changing of the data. The logic may be operative to detect integrity violations of protected container pages and prevents access to tampered code/data upon detection.

In one aspect, such cryptographic operations may be performed automatically and autonomously by the cryptographic unit, and transparently to software (e.g., as opposed to software having to perform multiple instructions of a software cryptographic algorithm). In some embodiments, the cryptographic unit may optionally selectively perform such cryptographic operations for the code and/or data of the protected containers but generally not for code and/or data of regular pages not belonging to protected containers.

In some embodiments, the protected container logic 116 may optionally include logic to generate and use version information associated with code and/or data of protected containers. For example, pages of the protected container may optionally be assigned version information (e.g., a unique version value, version counter, etc.) when they are stored out of the processor (e.g., to system memory). The protected container logic may optionally include logic to review such version information when the code and/or data (e.g., the pages) of the protected container are reloaded. In some embodiments, the protected container logic may only allow protected container pages indicated by be legitimate or valid by the version information (e.g., only the last evicted version) to be loaded. This may help to prevent replay of protected container code and/or data.

To further illustrate certain concepts, certain types of protection or security have been described above. However, it is to be appreciated that the types and levels of protection or security may vary from one implementation to another depending upon the particular implementation, environment, need for security, cost versus security tradeoffs, and the like. The embodiments described herein may be used in conjunction with protected containers of varying levels of security or protection. The scope of the invention is not limited to any known type or level of protection or security.

Referring again to FIG. 1, in some embodiments, the privileged system software 103 of the source computer system 110 may include a protected container live migration module 104 that is operative to control or manage live migration of the protected container 107 from the source computer system to the destination computer system 121. The term "live" means that the migration may be performed in part while the protected container is running on the source computer system. As further shown, in some embodiments, the processor includes one or more instructions 114 to support live migration of protected containers (e.g., the protected container 107). As mentioned above, these instructions are not limited to only being used for live migration of protected containers but rather may also optionally be used for various other purposes according to the creative genius of the programmer. In some embodiments, the one or more instructions may be privileged-level instructions that may only be executed at one or more privileged levels of execution, but not at a user-level or unprivileged-level of execution. The one or more privileged levels of execution are higher than a user-level of execution privilege that is used by user-level applications (e.g., word processing applications, email applications, spreadsheets, etc.). In some embodiments, the protected container live migration module 104 may use the one or more instructions 114. Moreover, in some embodiments, the processor includes logic 119 operative to perform the one or more instructions 114 to support the live migration of the protected containers. Advantageously, the instruction(s) and logic to perform the instructions may help to increase the efficiency of performing a live migration of the protected container, although the instructions may alternatively optionally be used for other purposes.

In some embodiments, the source computer system may include a key manager protected container 110 that may be operative to manage one or more migration capable or migratable keys (e.g., a key hierarchy) that may correspond to the protected container 107. As shown, the key manager protected container may also optionally be stored in the protected container memory. The key manager protected container may represent a trusted entity to control or manage the keys and allow them to be virtualized and migrated from the source computer system to the destination computer system in conjunction with the protected container being migrated from the source computer system to the destination computer system. In some embodiments, the key manager protected container may represent an architectural protected container. One suitable example of the key manager protected container, in an Intel® SGX implementation embodiment, is a migration engine (MigE), although the scope of the invention is not so limited. In other embodiments, the migration capable keys may optionally be implemented differently, such as, for example, stored in a special type of page in the protected container, controlled or managed by a different type of trusted entity, etc.

Depending upon the particular implementation, one or more other structures 111 may also optionally be used along with the protected container. For example, in some embodiments, there may be a structure to hold the one or more migration capable or migratable keys (e.g., a key hierarchy). For example, in an Intel® SGX implementation embodiment, there may be an SGX domain control structure (SDCS) to store migratable platform SGX keys, counters, and domain state. As another, in some embodiments, one or more version pages may optionally be included to store version information for protected container pages. For example, in an Intel® SGX implementation embodiment, there may be one or more version array pages operative to store version arrays for pages in the protected container memory. For example, there may be VA pages for pages stored from the EPC and invalidated in the EPC and an embodiment of VAX pages for pages stored from the EPC and according to an embodiment retained in a write protected, valid, and readable state in the EPC, as will be explained further below. As yet another example, an Intel® SGX implementation embodiment, there may be a paging crypto metadata (PCMD) structure that is operative to store crypto meta-data associated with a paged-out page, a page metadata structure (PGMD) that is operative to store metadata about the page. It is to be appreciated that data and/or metadata associated with protected containers may optionally be partitioned or combined in many different ways in different implementations, and that the scope of the invention is not limited to any known such way of partitioning or combining the data and/or metadata.

After the migration is complete, the destination computer system may have a migrated protected container 122. A simplified version of the destination computer system is shown, although it is to be appreciated that the destination computer system may optionally be similar to or the same as the source computer system. In general, it may be desirable to live migrate the protected container for various different reasons, and the scope of the invention is not limited to any known reason. In one aspect, the protected container may be migrated in conjunction with load balancing. For example, a virtual machine or other protected container utilization domain running on a source server of a datacenter, or cloud computing environment, may be using the protected container, and the domain as well as the protected container may be migrated from the source server to a destination server in order to balance workloads on the source and destination servers. In other embodiments, protected containers may be migrated for other reasons, such as, for example, to relocate workloads from a source computer system that is to be serviced, maintained, or upgraded, to relocate workloads from a running desktop to a portable computer, etc.

Figure 2:
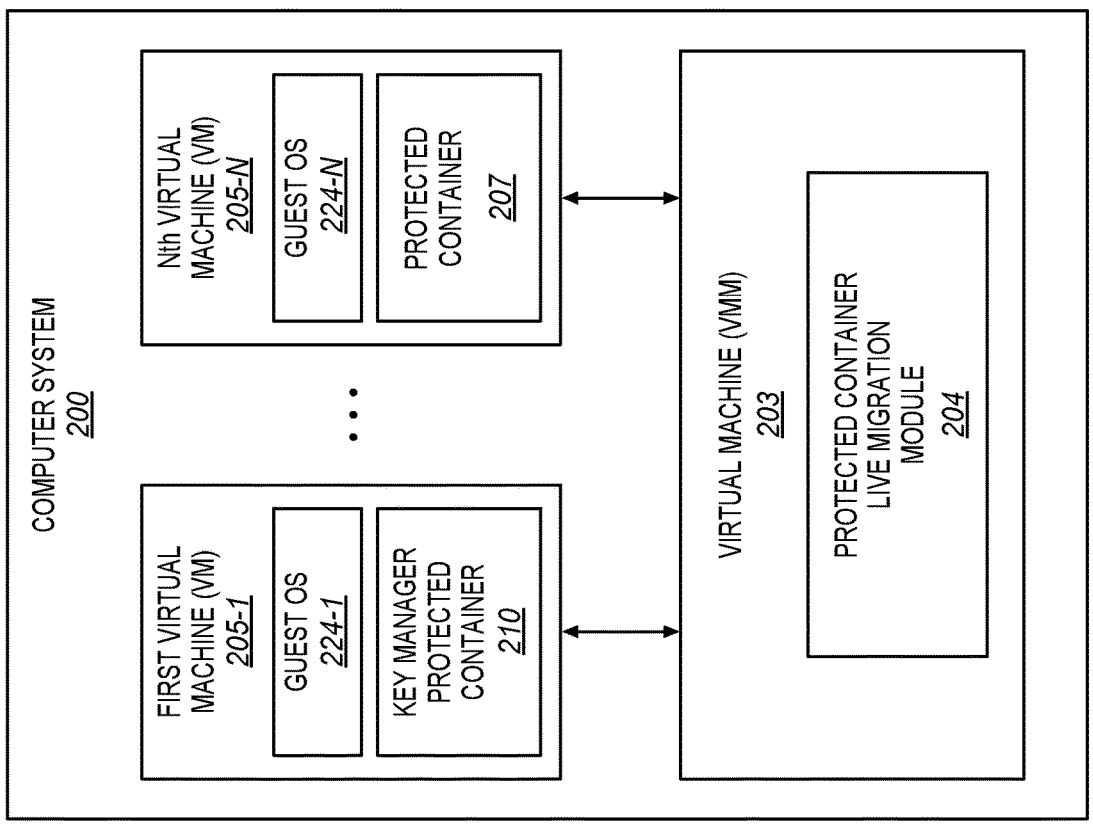
FIG. 2 is a block diagram of a first example embodiment of a software environment in which live migration may be performed on a protected container of a virtual machine.

FIG. 2 is a block diagram of a first example embodiment of a software environment in which live migration may be performed on a protected container 207 of a virtual machine (VM) 205-N. The computer system includes a virtual machine monitor (VMM) 203, and a first VM 205-1 through an Nth VM 205-N. The VMM may represent a host program, often in firmware, that is operative to provide virtualization management or control to allow the computer system to support the VMs. Representatively, the VMM may manage one or more processors, memory, and other resources of the computer system and allocate resources associated therewith to the VMs. Each VM may represent a virtual or software implementation of a machine that emulates execution of programs like a physical machine. Each VM may support the execution of a guest operating system (OS). As shown, the first VM may have a first guest operating system (OS) 224-1 and the Nth VM may have an Nth guest OS 224-N. The operating systems may either be multiple instances of the same OS or different OSs.

In the illustrated example, the Nth VM is to utilize the protected container 207. In some embodiments, the VMM may include a protected container live migration module 204 to control or manage the migration of the protected container out of the computer system. One or more processors (not shown) of the computer system may have one or more instructions, and logic to perform the instructions, to support the live migration, as described elsewhere herein. In some embodiments, the first VM may include a key manager protected container 210. In some embodiments, the key manager protected container may control or manage a set of one or more per-VM or VM specific keys (e.g., key hierarchies) each corresponding to a different one of the VMs that has a corresponding protected container.

Figure 3:
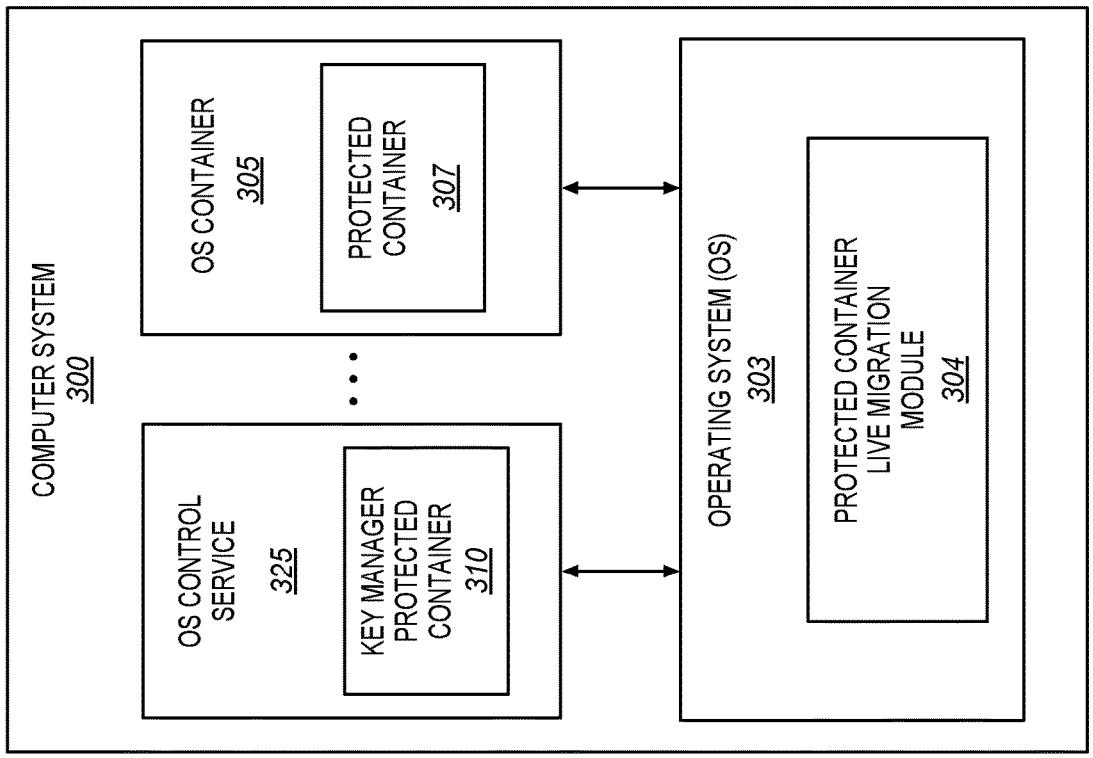
FIG. 3 is a block diagram of a second example embodiment of a software environment in which migration may be performed on a protected container of an operating system container.

FIG. 3 is a block diagram of a second example embodiment of a software environment in which migration may be performed on a protected container 307 of an operating system container 305. The computer system includes an operating system (OS) 303, the OS container 305 having the protected container 307, and an OS control service 325. The OS 303 may represent the kernel and may provide for container-based virtualization or OS virtualization. The OS container may represent an application within the OS that represent the virtualization layer similar to guest virtual machines. In some embodiments, the OS may include a protected container live migration module 304 to control or manage migration of the protected container out of the computer system. As before, one or more processors (not shown) of the computer system may have one or more instructions, and logic to perform the instructions, to support live migration of the protected container, as described elsewhere herein. Likewise, in some embodiments, the OS control service may include a key manager protected container 310. In some embodiments, the key manager protected container may control or manage a set of one or more per-OS container or OS container specific keys (e.g., key hierarchies) each corresponding to a different one of the OS containers that has a corresponding protected container.

Figure 4:
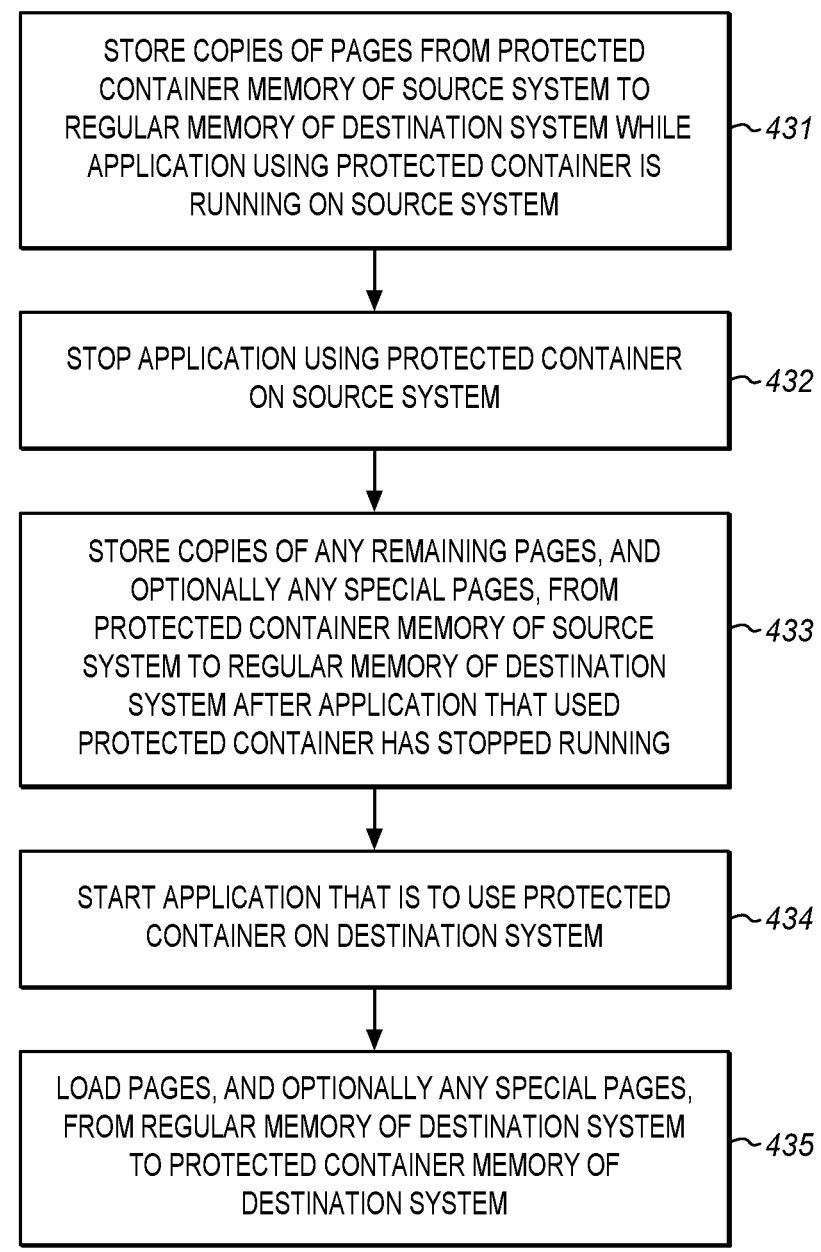
FIG. 4 is a block flow diagram of an embodiment of a method of migration of a protected container from a source computer system to a destination computer system.

FIG. 4 is a block flow diagram of an embodiment of a method 430 of migration of a protected container from a source computer system to a destination computer system. In some embodiments, the method may be controlled or managed by cooperating protected container live migration modules on the source and destination computer systems.

At block 431, copies of pages of the protected container may be stored from a protected container memory of the source computer system to encrypted copies in a regular memory of the destination computer system, while an application or domain (e.g., a VM, OS container, etc.) that is using the protected container is running on the source computer system. In some embodiments, the operation at block 431 may optionally be performed using the method of FIG. 5, or a portion thereof, including any of the variations mentioned therefor, although the scope of the invention is not so limited.

In some embodiments, each page may be write protected in the protected container memory of the source computer system, before a copy (e.g., an encrypted copy) of the page is stored from the protected container memory of the source computer system to an outside location (e.g., to a regular memory of the source computer system). In some embodiments, before storing the copy (e.g., the encrypted copy) of each write protected page from the protected container memory of the source computer system to the outside location, the corresponding processor of the source computer system may ensure or verify that there are no writable references to the write protected page. In some embodiments, after the copy of each write protected page has been stored from the protected container memory of the source computer system to the outside location, the write protected page may be retained as write-protected, but valid and readable, in the protected container memory of the source computer system. That is, in some embodiments, copies of the page may exist simultaneously in the protected container memory (e.g., an EPC) of the source computer system, and also as an encrypted copy outside of the protected container memory (e.g., in regular memory of the source or destination computer systems). Advantageously, this may allow the running application or domain of the source computer system to read data from the page while the protected container live migration module concurrently works to migrate the page to the destination computer system.

In some embodiments, in order to reduce the amount of downtime needed to achieve the full migration of the protected container, from most to substantially as many pages as possible, may be copied from the protected container memory to the regular memory of the destination storage location, while the application or domain (e.g., the VM or OS container) is running on the source system. These pages may at least conceptually be viewed as a write working set and a non-write working set. Pages in the write working set tend to be written during the migration window or timespan while the application or domain is running. In contrast, pages in the non-write working set tend to not be written or not likely be written during the migration window or timespan while the application or domain is running. Generally, from most to substantially all of the pages in the non-write working set, and potentially some of the pages in the write working set (e.g., those which have not been written after they have been copied from the protected container memory) may potentially be copied from the protected container memory to the outside location, while the application or domain is running. In addition, write protected pages copied from the protected container memory may still be read from, even after they have been copied from the protected container memory, since these pages are write protected, but are still valid (unless a subsequent write to the pages has been detected), and readable. This may allow the application or domain to read from these pages while the migration of these pages progresses.

In one aspect, the protected container live migration module may iterate through all of the protected container pages one or more times, copying them from the protected container memory, assuming the pages are not in the write working set. If an attempted write to a write protected page is detected, the speculative copy of the page stored outside of the protected container memory may be invalidated. Otherwise, the page may be retained in the protected container in the write protected but valid and readable state. After the first iteration, the protected container live migration module may optionally iterate through the remaining uncopied protected container pages one or more times, a predetermined number of times, until the number of such remaining uncopied pages becomes small enough (e.g., decreases below a threshold number or proportion), or according to some other desired criteria. Typically, after a few iterations, the set of remaining uncopied protected container pages should approximately converge to the write working set of pages that tend to be written during the migration window or timeframe. Advantageously, write protecting the protected container pages, and allowing them to be valid and readable in the protected container memory, may help to reduce the downtime of the application or domain needed to achieve the live migration of the protected container. Rather than invalidating the pages, the pages may still remain readable in the protected container memory. Effectively approximately all pages outside of the write working set may be copied from the protected container memory instead of just those pages outside of the larger set of pages representing the working set (e.g., which additionally includes those pages the application tends to read from during the migration window). This may help to reduce the number of pages that need to be copied after the application is de-scheduled or stopped, which may help to reduce downtime.

Referring again to FIG. 4, at block 432, execution of the application that is using the protected container on the source computer system may be stopped. In various embodiments, the application may optionally be a VM or an OS container, although this is not required.

At block 433, copies of any remaining uncopied pages, and optionally any remaining uncopied special pages, may be copied from the protected container memory of the source computer system to encrypted copies in regular memory of the destination computer system, after the application or domain that was using the protected container has stopped running. In some embodiments, one or more special pages may optionally be used, although the scope of the invention is not so limited. As one example, one or more special pages may optionally be used to store migration capable keys. As another example, one or more special pages may optionally be used to store version information for pages of the protected container. For example, in an Intel® SGX implementation embodiment, an SDCS page may be used to store migration capable keys, and one or more version array pages (VAX) may be used to store version information for pages written out of the protected container memory but retained in a write protected, valid, and readable state. In other embodiments, a single special page may be used to store both migration capable keys and version information, or migration capable keys and/or version information may instead be stored in the protected container pages themselves, or such information may optionally be stored in other data structures, etc.

At block 434, an application or domain that is to use the protected container on the destination computer system may start running. In various embodiments, the application may optionally be a VM or an OS container, although this is not required.

At block 435, encrypted pages, and optionally encrypted special pages, may be loaded from the regular memory of the destination computer system to unencrypted pages in a protected container memory of the destination computer system. For example, a protected container may be created and initialized in the protected container memory of the destination computer system, and then pages may be loaded into the protected container. In some embodiments, the special pages may optionally be loaded into the protected container memory before regular pages are loaded into the protected container memory, although the scope of the invention is not so limited.

Figure 5:
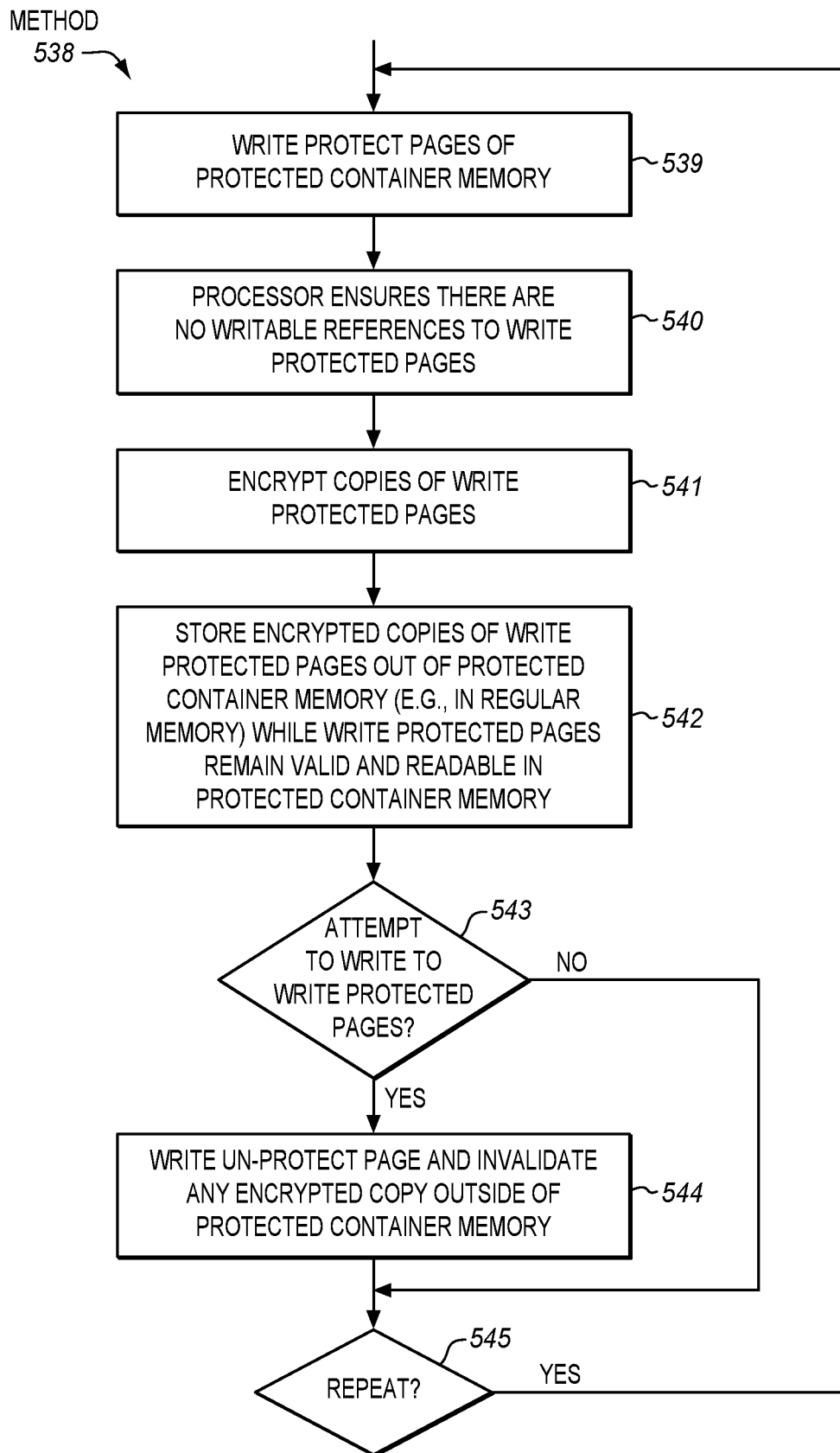
FIG. 5 is a block flow diagram of an embodiment of a method of write protecting pages of a protected container memory, and storing encrypted copies of the write protected pages outside of the protected container memory, while leaving the write protected pages valid and readable in the protected container memory.

FIG. 5 is a block flow diagram of an embodiment of a method 538 of write protecting pages of a protected container memory, and storing encrypted copies of the write protected pages outside of the protected container memory, while leaving the write protected pages valid and readable in the protected container memory. In some embodiments, the method may be controlled or managed by a protected container live migration module of a source computer system, while migrating a protected container to a destination computer system, although the scope of the invention is not so limited. For example, in some embodiments, the method may optionally be performed at block 431 of FIG. 4, although the scope of the invention is not so limited. The method may either be performed with the computer system of FIG. 1, or a similar or different computer system. The characteristics and components described for the computer system 100 may optionally be used in the method, but are not required. In some embodiments, the method may be performed with one or more instructions (e.g., the instructions 114 of FIG. 1 and/or the instructions 614 of FIG. 6), of an instruction set of a processor, which are operative to support live migration of the protected container.

At block 539, pages of the protected container memory may be write protected. The pages of the protected container memory may either be stored in their secure storage within the protected container memory in system memory or may be cached or otherwise stored in secure storage in caches or other on-die storage locations of a processor that is operative to keep them secure therein. In some embodiments, each page may be write protected responsive to execution or performance of a single instruction of the instruction set. In some embodiments, each page may be write protected by configuring a write protection indication in a protected container page metadata structure (e.g., PCPMS 109) to indicate that the page is write protected. For example, in an embodiment of an Intel® SGX implementation, enclave pages may be write protected by configuring (e.g., setting) a write protect (WP) bit in an enclave page cache map (EPCM). In some embodiments, while write protected, the pages may be valid and readable. In some embodiments, each write protected page may also be made read only in paging structures (e.g., extended paging tables), although the scope of the invention is not so limited. In some embodiments, the modification of the paging structures may optionally be outside of the confines of the instruction that is used to modify the write protection indication in the PCPMS. In various aspects, from an overall algorithmic perspective, the pages may be write protected one at a time, or in batches, or all pages in the protected container may be write protected at one time.

At block 540, a processor may ensure or verify that there are no writeable references to the write protected pages. This may be done in different ways in different embodiments. In some embodiments, this may be implemented with a TLB tracking mechanism. TLBs may cache translations from a virtual to physical addresses associated with pages. Permissions associated with accessing those permissions, such as read and write permissions, may also be cached in the TLBs. These permissions cached in the TLBs reflect the permissions at the time the translations were performed when the page table walks were performed. On memory access requests, if the MMU finds the translation in the TLBs, it may bypass the page table lookup and use the translation, as well as the permissions, which is cached in the TLBs. That is, the MMU may use permissions from the TLBs, which could be outdated, instead of looking up the permissions in the page table and/or checking the permissions in the PCPMS (e.g., the EPCM). In a case where a page has permissions in the TLB that indicate it is writable, a thread could write to the page even after the page has been write protected (e.g., as described at block 539). To enhance security, the method may ensure that such cached permissions are flushed from the TLB(s). This may be done before making the copy of the write protected page. This may be done in different ways in different embodiments. As one example, epoch counters may be used to determine when a thread may have access to such a TLB mapping, and when such a TLB mapping must have been cleared (e.g., the thread must have observed the write protection of the page). Once all threads have observed the write protection of the page, then it may be ensured that there are no more writable references to write protected pages. In some embodiments, in an Intel® SGX implementation embodiment, an ETRACK instruction and associated mechanism may optionally be used to ensure that write mappings to a page being migrated are removed from the TLB prior to writing the page out to main memory. By way of example, the ETRACK instruction may be used to configure microarchitectural tracker logic to detect when all logical processors executing in an enclave at the time of execution of the ETRACK instruction have exited the enclave and therefore all the TLB entries have been evicted (e.g., TLB entries created during enclave execution may be evicted when exiting the enclave).

At block 541, encrypted copies of the write protected pages of the protected container memory may be generated. In some embodiments, the encrypted copy of each write protected page may be generated responsive to execution or performance of a single instruction of the instruction set. In some embodiments, a cryptographic unit (e.g., cryptographic unit 118) of a processor, which may be used to encrypt protected container pages when they are written out of the processor to anywhere in system memory including into the protected container memory and regular system memory outside of the protected container memory, may be used. In some embodiments, different encryptions may optionally be used to store encrypted protected container pages to the regular memory versus the protected container memory, although this is not required.

At block 542, the encrypted copies of the write protected pages of the protected container memory (e.g., the encrypted copies generated at block 540) may be stored out of the protected container memory (e.g., in regular memory of the same computer system or otherwise in non-protected container memory). In some embodiments, the encrypted copies may be stored in the regular memory, while the corresponding write protected pages remain valid and readable in the protected container memory. In some embodiments, an application or domain using the associated protected container may be allowed to read from the write protected pages in the protected container memory, after the encrypted copies have been stored out of the protected container memory. Another alternative possible approach would be to invalidate the pages (e.g., instead of write protecting them and allowing them to remain valid and readable), although this may have potential drawbacks, such as not allowing the pages to be read from and/or reducing the overall number of pages that can be stored out of the protected container memory, while the application is running. In some embodiments, the encrypted copy of each write protected page may be stored out of the protected container memory (e.g., to the regular memory) responsive to the execution or performance of a single instruction of the instruction set. In some embodiments, the encrypted copies may be stored out of the protected container memory (e.g., to the regular memory) only after ensuring or verifying that there are no writable references to the write protected pages (e.g., after block 541).

At block 543, a determination may be made whether an attempt to write to a write protected page of the protected container memory has been detected. If no such attempted write has been detected (i.e., "no" is the determination at block 543), then the method may advance to block 545. This may allow the page to remain write protected, but valid and readable, in the protected container memory, while only one true non-dirty copy of the page exists thereby allowing security to be maintained.

Conversely, if such an attempt to write to a write protected page has been detected (i.e., "yes" is the determination at block 543), then the method may advance to block 544. Representatively, such an attempt may potentially be detected by logic of the processor (e.g., responsive to an extended page table violation), and responsive thereto the logic may signal a fault. At block 544, the write protected page may be write-unprotected (e.g., the page may be made writable), and any encrypted copies outside of the protected container memory (e.g., in the regular memory of the source computer system, or in the regular memory of the destination computer system) may be invalidated. Invalidating the copies outside of the protected container memory may help to ensure security, such as, for example, by ensuring that there is only one true copy of a page (e.g., that the contents of the encrypted copy and the page in the protected container memory do not diverge). In some embodiments, the page may be write-unprotected, and the encrypted copies outside of the protected container memory may be invalidated, responsive to the execution or performance of a single instruction of the instruction set. In some embodiments, the page may be write unprotected by configuring a write protection indication in a protected container page metadata structure (e.g., PCPMS 109) to indicate that the page is write unprotected. For example, in an embodiment of an Intel® SGX technology implementation, each page may be write unprotected by configuring (e.g., clearing) a write protect (WP) bit in an enclave page cache map (EPCM). In some embodiments, the page may also be made readable and writable in paging structures (e.g., extended paging tables), although the scope of the invention is not so limited. In some embodiments, the modification of the paging structures may be outside of the confines of the instruction that is used to modify the write protection indication in the PCPMS.

The method may advance from either block 543 or block 544 to block 545. At block 545, a determination may be made whether or not to repeat the method. If the method is to be repeated (i.e., "yes" is the determination at block 545), the method may revisit block 539. Alternatively, the method may end. The determination of whether to repeat the method may be performed in different ways in different embodiments. For example, the method may be performed a predetermined or configurable number of times (e.g., the determination may involve a loop counter with a threshold). As another example, the determination may involve determining whether additional pages are still being write protected (e.g., at block 539) and stored in the immediately prior iteration, if more additional pages are being write protected (e.g., at block 539) and stored in the immediately prior iteration than the number of pages un-write protected (e.g., at block 544), or the like. Alternatively, the method may optionally be performed only once and block 545 may optionally be omitted.

It is to be appreciated that this is just one illustrative example of a method. Other methods may include a subset of the illustrated blocks. For example, an alternate method may include only block 539. Another alternate method may include blocks 540, 541, and 542. Yet another block may include only block 544. Various other combinations of the blocks are also contemplated. Also, additional operations may optionally be added to the method. Moreover, some operations or blocks may optionally be overlapped (e.g., blocks 540 and 541 may be overlapped), or performed in a different order (e.g., block 541 may be performed before block 540, block 543 may be performed continuously throughout the method, etc.).

Figure 6:
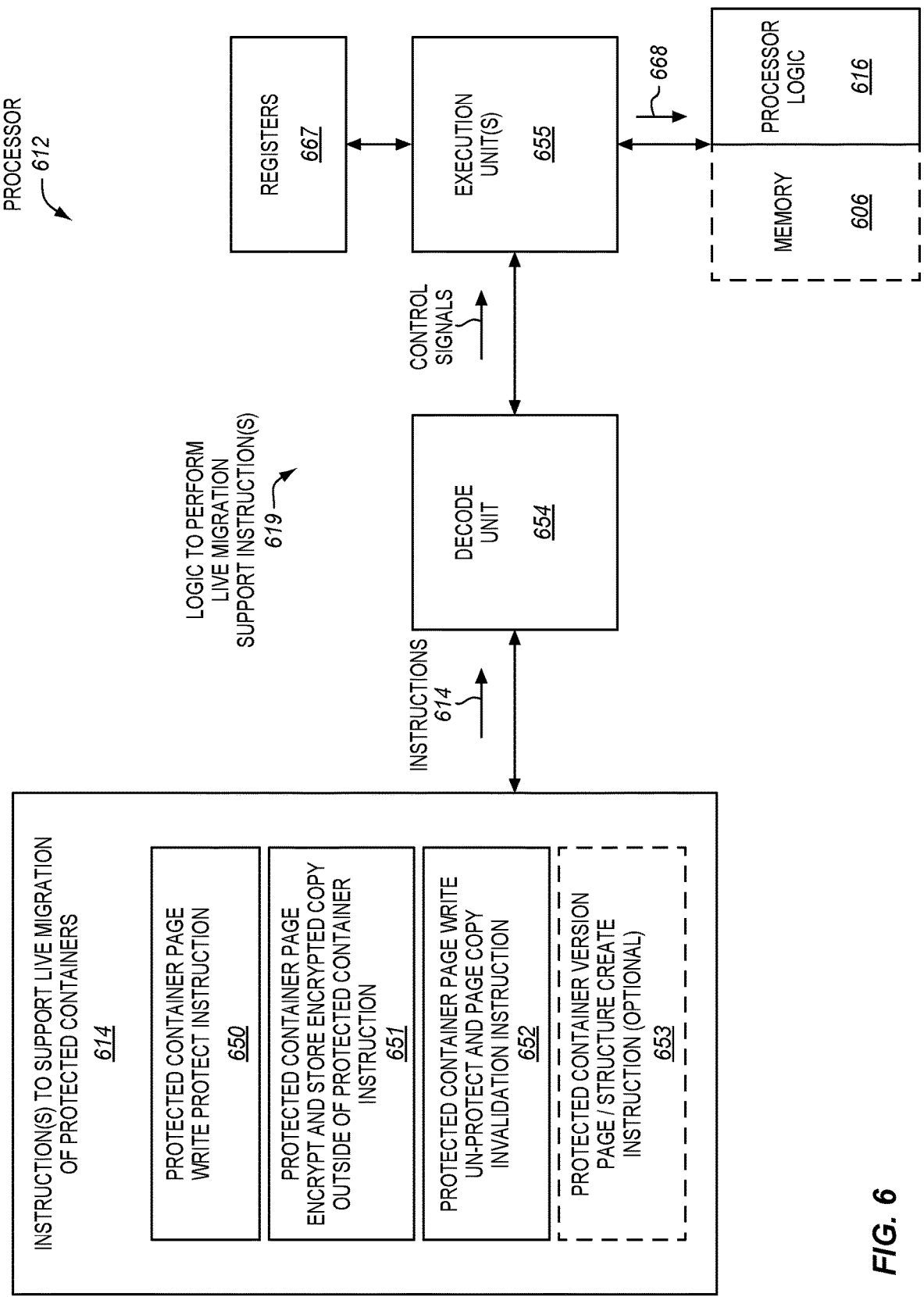
FIG. 6 is a block diagram of an embodiment of a processor that is operative to perform an embodiment of a set of one or more instructions to support live migration of protected containers.

FIG. 6 is a block diagram of an embodiment of a processor 612 that is operative to perform an embodiment of a set of one or more instructions 614 to support live migration of protected containers. As previously mentioned, the instructions may also be used for other purposes besides supporting live migration of protected containers. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, cryptographic processors, network processors, communications processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

The set of the one or more instructions 614 to support live migration of a protected container may be instructions of an instruction set of the processor. The instructions may represent macroinstructions, machine code instructions, or assembly language instructions. In the illustrated example embodiment, the instructions include four different instructions, although the scope of the invention is not so limited. Specifically, the instructions include a protected container page write protect instruction 650, a protected container page encrypt and store encrypted copy outside of protected container memory instruction 651, an optional protected container page write unprotect and page copy invalidation instruction 652, and an optional protected container version array page create instruction 653.

In other embodiments, fewer or more than four instructions may optionally be used. For example, in an alternate embodiment, any single one of these instructions may optionally be included and the others optionally omitted. As one example, only a protected container page write protect instruction may optionally be included. As another example, only a protected container page encrypt and store encrypted copy outside of protected container memory instruction may optionally be included. As yet another example, only a protected container page write protect instruction and a protected container page encrypt and store encrypted copy outside of protected container memory instruction may optionally be included. Also, one or more other instructions may optionally be added, along with one or more of the four instructions shown.

In still other embodiments, the functionality of these four instructions may be apportioned differently. As one specific example, the operations of the protected container write protect instruction 650 and that of the protected container page encrypt and store encrypted copy outside of protected container memory instruction 651 may optionally be combined into a single instruction. As another specific example, the encrypt operation of the protected container page encrypt and store encrypted copy outside of protected container memory instruction 651 may optionally instead be apportioned to and performed by the protected container write protect instruction 614. As yet another specific example, the operations of the protected container version array page create instruction 653 and that of either the protected container page write protect instruction 650 or the protected container page encrypt and store encrypted copy outside of protected container memory instruction 651 may optionally be combined into a single instruction. These are just a few illustrative examples. Other variations will be apparent to those skilled in the art and having the benefit of the present disclosure.

Referring again to FIG. 6, the processor includes a decode unit or decoder 654. The decode unit may receive and decode any of the one or more instructions 614. The decode unit may output one or more relatively lower-level instructions or control signals (e.g., one or more microinstructions, micro-operations, micro-code entry points, decoded instructions or control signals, etc.), which reflect, represent, and/or are derived from the received relatively higher-level instructions. In some embodiments, the decode unit may include one or more input structures (e.g., port(s), interconnect(s), an interface) to receive an instruction, an instruction recognition and decode logic coupled therewith to recognize and decode the received instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

The processor also includes a set of registers 667 (e.g., general-purpose registers). Each of the registers may represent an on-die storage location that is operative to store data. The registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof. In some embodiments, the registers may be used to store input and/or output data associated with the instructions. In one aspect, the registers may include any of the general-purpose registers shown and described for any of FIGS. 7-9 and may have any of the described input and/or output mentioned therefor.

An execution unit 655 is coupled with the decode unit 654 and the registers 667. The execution unit may receive the one or more decoded or otherwise converted instructions or control signals that represent and/or are derived from any one of the instructions being decoded (e.g., any one of the instructions 614). The execution unit is operative in response to and/or as a result of the instruction being decoded (e.g., in response to one or more instructions or control signals decoded from the instruction) to perform one or more operations 668 to achieve the operations of the instruction. As shown, the execution unit may be coupled with, or otherwise in communication with, other logic of the processor 616 and/or pages or structures in a memory 606 to implement the operations of the particular instruction being performed. In some embodiments, the execution unit may be any of the execution units shown and described for any of FIGS. 7-9 and may perform any of the operations described therefor.

The execution unit and/or the processor may include specific or particular logic (e.g., transistors, integrated circuitry, or other hardware potentially combined with firmware (e.g., instructions stored in non-volatile memory) and/or software) that is operative to perform such operations in response to and/or as a result of the instructions (e.g., in response to one or more instructions or control signals decoded from the instructions). In some embodiments, the execution unit may include one or more input structures (e.g., port(s), interconnect(s), an interface) to receive source data, circuitry or logic coupled therewith to receive and process the source data, and one or more output structures (e.g., port(s), interconnect(s), an interface) coupled therewith to effect the operations.

To avoid obscuring the description, a relatively simple processor has been shown and described. However, the processor may optionally include other processor components. For example, various different embodiments may include various different combinations and configurations of the components shown and described for any of FIGS. 10-12. All of the components of the processor may be coupled together to allow them to operate as intended.

Figure 7:
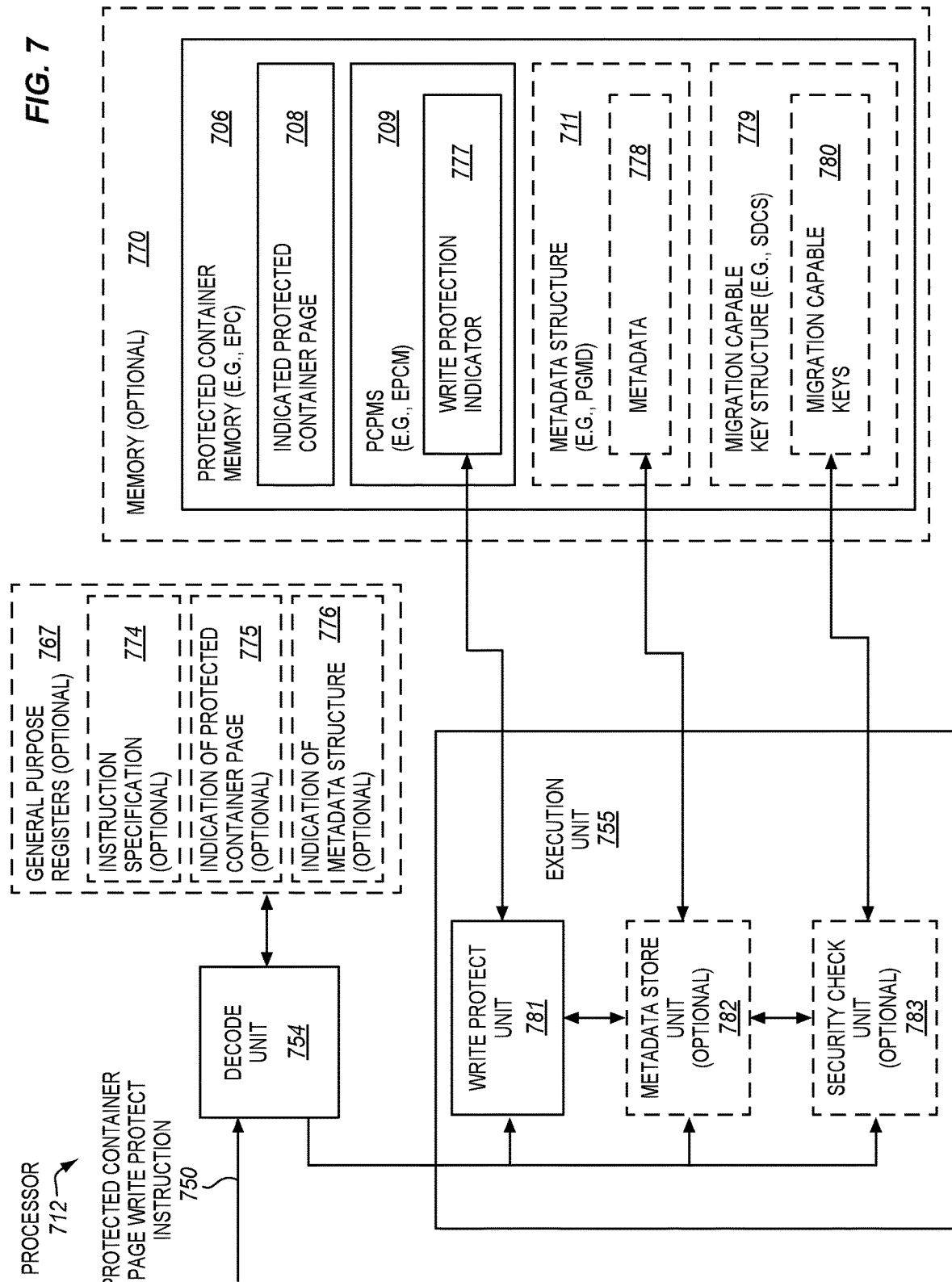
FIG. 7 is a block diagram of an embodiment of a processor that is operative to perform an embodiment of a protected container page write protect instruction.

FIG. 7 is a block diagram of an embodiment of a processor 712 that is operative to perform an embodiment of a protected container page write protect instruction. The processor includes a decode unit 754, an execution unit 755, and optionally a set of registers 767 (e.g., general-purpose registers). Unless specified, or otherwise clearly apparent, these components may optionally have some or all of the characteristics of the correspondingly named components of FIG. 6. To avoid obscuring the description, the different and/or additional characteristics will primarily be described without repeating all of the optionally common characteristics. Moreover, in some embodiments, the processor 712 may be used in the source computer system 100 of FIG. 1. Alternatively, the processor 712 may be used in a similar or different computer system.

The decode unit 754 may receive the protected container page write protect instruction 750. In some embodiments, the protected container page write protect instruction may be a privileged-level instruction that can only be performed at a privileged-level of execution, but not at an unprivileged or user-level of execution. For example, the protected container page write protect instruction may only be performed at a ring 0 level of privilege, for example, by an operating system, a virtual machine monitor (VMM), or other privileged system software, but not by user-level application software. In some embodiments, the instruction may indicate additional instruction specification information 774, although this is not required. For example, in an Intel® SGX implementation embodiment, the instruction may be a privileged-level ENCLS instruction, which may be executed at ring 0 privilege level, and may implicitly indicate general-purpose register EAX as having a leaf function index value of "28 h" to indicate an EPC page write protect operation, although the scope of the invention is not so limited. Although the instruction may be used in various different ways not related to migration of protected containers, in one aspect such privileged software may potentially use the protected container page write protect instruction to write protect a protected container page, before an encrypted copy of the page is stored out of the protected container memory, in conjunction with live migration of a protected container.

In some embodiments, the protected container page write protect instruction may indicate a protected container page 708. The page may be indicated in different ways in different embodiments. In some embodiments, the instruction may explicitly specify (e.g., through one or more fields or a set of bits), or otherwise indicate (e.g., implicitly indicate), a register (e.g., one of the general-purpose registers 767) that is to store an effective address or other indication 775 of the protected container page. As one example, the instruction may optionally have a register specification field to specify a register that is to have the effective address to indicate the protected container page. As another example, the instruction may optionally implicitly or impliedly indicate an implicit register that is to have the effective address to indicate the protected container page. Upon receiving the instruction it may be understood, although not expressed explicitly, to use the implicit register to find the effective address. As one specific example, in an Intel® SGX implementation embodiment, the implicit general-purpose register RCX may store the effective address of an enclave page cache (EPC) page.

The processor may be operative to combine the effective address with other address information in order to obtain the address of the protective container page. For example, the data segment (DS) segment may be used to create a linear or virtual address. As shown, in some embodiments, the protected container memory 706 may optionally be in a system memory 770 coupled with the processor. Alternatively, the protected container memory may optionally be one or more caches or other on-die storage of the processor. As one specific example, in an Intel® SGX implementation embodiment, the protected container memory may be an enclave page cache (EPC).

An execution unit 755 is coupled with the decode unit 754 and the optional general-purpose registers 767. The execution unit, in response to the protected container page write protect instruction, may be operative to write protect the indicated protected container page 708 of the protected container memory 706, which may either be in system memory or an on-die cache or other on-die storage. In some embodiments, the execution unit may have a write protect unit that is operative to write protect the page by configuring a write protection indicator 777, which corresponds to the indicated page, to indicate that the page is write protected. Different types of write protection indicators are suitable for different embodiments. In some embodiments, the write protection indicator may be implemented as one or more bits in the protected container memory, in an access control protected data structure in processor reserved memory, in an access control protected register or other structure of the processor, or the like. As shown, in some embodiments, the write protection indicator may optionally be included in a protected container page security metadata structure (PSPMS) 709 that is to store metadata (e.g., security and access control metadata) for pages in the protected container memory. In some embodiments, the PSPMS may have different write protection indicators for each corresponding different page in the protected container memory. According to one possible convention, the write protection indicator may be a single bit that may be configured to have a first binary value (e.g., set to binary one) to indicate that the corresponding indicated protected container page 708 is not write protected, or a second different binary value (e.g., cleared to binary zero) to indicate that the corresponding indicated protected container page is write protected. As one specific example, in an Intel® SGX implementation embodiment, the execution unit may write protect an enclave page of an enclave page cache (EPC) by setting a write protect (WP) bit in an enclave page cache map (EPCM) to indicate that the page as well as non-supervisory fields in the EPCM are write protected, although the scope of the invention is not so limited. Representatively, when the WP bit of the EPCM is set, the page miss handler (PMH) unit and/or the translation lookaside buffer (TLB) may signal a fault (e.g., a write protect fault, page fault, etc.) if a write access to the page is attempted.

In some embodiments, the instruction may optionally explicitly specify or otherwise indicate a metadata structure 711 that is to be used to store metadata 778 for the indicated protected container page 708 of the protected container memory. The metadata structure may be indicated in different ways in different embodiments. In some embodiments, the instruction 750 may explicitly specify (e.g., through one or more fields or a set of bits), or otherwise indicate (e.g., implicitly indicate), a register (e.g., one of the general-purpose registers 767) that is to store an effective address or other indication 776 of the metadata structure. As one example, the instruction may optionally have a register specification field to specify a register that is to have the effective address to indicate the metadata structure. As another example, the instruction may optionally implicitly or impliedly indicate an implicit register that is to have the effective address to indicate the metadata structure. As one specific example, in an Intel® SGX implementation embodiment, the implicit general-purpose register RBX may store the effective address of a page metadata (PGMD) structure, although the scope of the invention is not so limited. In other embodiments, other data structures may optionally be used to store the metadata (e.g., a PCPMS). The execution unit, responsive to the instruction, may be operative to store metadata 778 pertaining to the indicated protected container page in the metadata structure 711. As shown, the execution unit may have an optional metadata store unit 782 to store the metadata in the metadata structure. Alternatively, in other embodiments, such storage of metadata may optionally be omitted (e.g., may not be needed, may be performed by another instruction, etc.).

In some embodiments, the execution unit, before write protecting the protected container page, may optionally be operative to perform one or more security or verification checks. In some embodiments, the execution unit may include security check unit 783 to check or verify that a migration capable key structure 779, which has migration capable keys 780, has control over the indicated protected container page 708. For example, in an Intel® SGX implementation embodiment, the execution unit may be operative to determine that a current SGX domain control structure (SDCS), which may have migration capable SGX keys, counters, and crypto-meta data, has control over the protected container page, although the scope of the invention is not so limited. Alternatively, in other embodiments, such security or verification checks may optionally be omitted (e.g., may not be needed, may be performed by another instruction, etc.).

Figure 8:
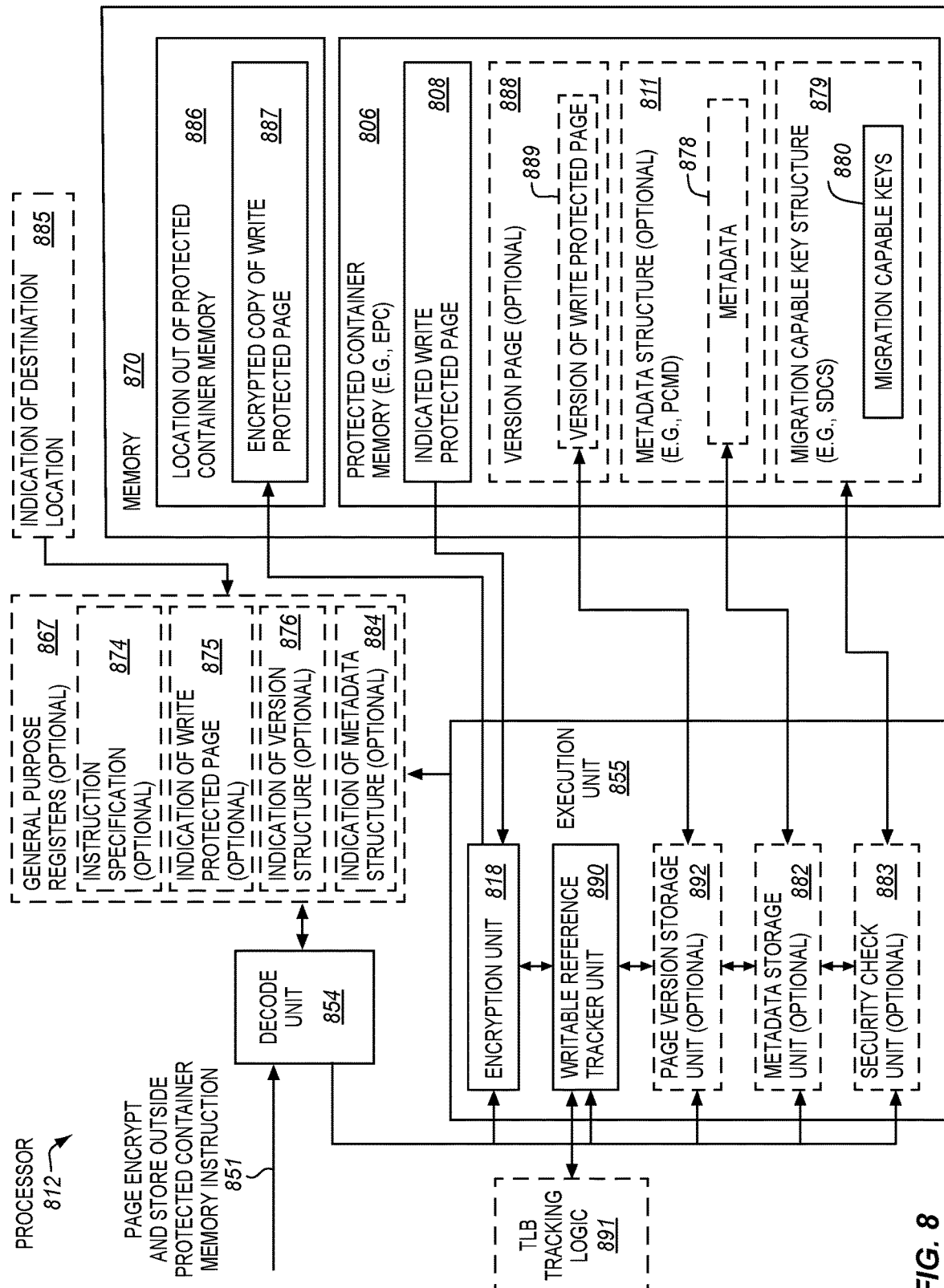
FIG. 8 is a block diagram of an embodiment of a processor that is operative to perform an embodiment of a protected container page encrypt and store encrypted copy outside of protected container memory instruction.

FIG. 8 is a block diagram of an embodiment of a processor 812 that is operative to perform an embodiment of a protected container page encrypt and store encrypted copy outside of protected container memory instruction 851. The processor includes a decode unit 854, an execution unit 855, and optionally a set of registers 867 (e.g., general-purpose registers). Unless specified, or otherwise clearly apparent, these components may optionally have some or all of the characteristics of the correspondingly named components of FIG. 6. To avoid obscuring the description, the different and/or additional characteristics will primarily be described without repeating all of the optionally common characteristics. Moreover, in some embodiments, the processor 812 may be used in the source computer system 100 of FIG. 1. Alternatively, the processor 812 may be used in a similar or different computer system.

The decode unit 854 may receive the instruction 851. In some embodiments, the instruction may be a privileged-level instruction that can only be performed at a privileged-level of execution, but not at an unprivileged or user-level of execution. In some embodiments, the instruction may indicate additional instruction specification information 874, although this is not required. For example, in an Intel® SGX implementation embodiment, the instruction may be a privileged-level ENCLS instruction, and may implicitly indicate general-purpose register EAX as having a leaf function index value of "2 Ah" to indicate a store encrypted page from EPC operation and leave page readable in EPC operation, although the scope of the invention is not so limited. Although the instruction may be used in general ways, in one aspect such privileged software may potentially use the instruction to store an encrypted copy of a write protected page (e.g., one write protected by a previous write protect instruction as disclosed herein) out of protected container memory (e.g., to regular memory), while a protected container is in operation in conjunction with live migration of the protected container.

In some embodiments, the instruction may indicate a write protected page 808 of a protected container memory 806. The write protected page may be indicated in different ways in different embodiments. In some embodiments, the instruction may explicitly specify (e.g., through one or more fields or a set of bits), or otherwise indicate (e.g., implicitly indicate), a register (e.g., one of the general-purpose registers 867) that is to store an effective address or other indication 875 of the write protected page 808. As one specific example, in an Intel® SGX implementation embodiment, the implicit general-purpose register RCX may store the effective address of the write protected EPC page that is to be stored out of the EPC (e.g., to regular memory). As shown, in some embodiments, the protected container memory 806 may optionally be in a system memory 870 coupled with the processor (e.g., in a hardware reserved portion of the system memory). Alternatively, the protected container memory 806 may optionally be one or more caches or other on-die storage of the processor. A combination is also suitable. As one specific example, in an Intel® SGX implementation embodiment, the protected container memory may be an enclave page cache (EPC).

An execution unit 855 is coupled with the decode unit and the optional general-purpose registers 867. The execution unit, in response to the protected container page write protect instruction, may be operative to ensure that there are no writable references to the write protected page of the protected container memory, while the page of the hardware enforced protected container memory has a write protected state. As shown, the execution unit may include a writable reference tracker unit 890 that may be coupled with a TLB tracking logic 891. The writable reference tracker logic may be operative to communicate with the TLB tracking logic to ensure that there are no writable references to the write protected page of the protected container memory. This may optionally be performed as described elsewhere herein, or by other approaches. In some embodiments, an ETRACK instruction and associated mechanism may optionally be used to ensure that write mappings to a page being migrated are removed from the TLB prior to writing the page out to main memory. By way of example, the ETRACK instruction may be used to configure micro-architectural tracker logic to detect when all logical processors executing in an enclave at the time of execution of the ETRACK instruction have exited the enclave and therefore all the TLB entries have been evicted (e.g., TLB entries created during enclave execution may be evicted when exiting the enclave).

The execution unit, in response to the protected container page write protect instruction, may also be operative to encrypt a copy of the indicated write protected page 808 of the protected container memory. As shown, the execution unit may include an encryption unit 818 (e.g., which may be a part of the cryptographic unit 118 of FIG. 1) to perform such encryption.

The execution unit may further be operative to store the encrypted copy 887 of the write protected page of the protected container memory to a destination location 886, which is outside of the protected container memory 806, after it has been ensured that there are no writable references to the page of the hardware enforced protected container memory. In some embodiments, the destination location may be in regular memory, such as, for example, memory used to store user-level applications (e.g., Internet browsers, database applications, word processing applications, etc.). In some embodiments, the write protected page in the protected container memory may be in processor reserved memory, but the encrypted copy may be stored outside of the processor reserved memory. In some embodiments, the instruction may explicitly specify or otherwise indicate an indication 885 of the destination storage location, such as, for example, by having a specified or implicit register to store this indication. The execution unit may further be operative to leave the write protected page 808 in the protected container memory 806 in the write protected state, which is also valid and readable (e.g., as opposed to being invalidated), after the encrypted copy 887 of the write protected page has been stored to the indicated destination location 886 outside the protected container memory (e.g., in regular memory that is non-processor reserved memory). Allowing the write protected page to remain valid and readable may offer advantages as described elsewhere herein, such as, for example, allowing the page to be read from, reducing the downtime following live migration, etc.

In some embodiments, the execution unit may optionally be operative to store version information 889 for the write protected page 808 that is stored out of the protected container memory. For example, the execution unit may include a page version storage unit 892 to store the version information 889. In some embodiments, the instruction may indicate a version page 888 that is to store version information for pages in the protected container memory. Alternatively, instead of a version page another structure may be used to store the version information. In some embodiments, the instruction may explicitly specify, or otherwise indicate, a register (e.g., one of the general-purpose registers 867) that is to store an effective address or other indication 876 of the version page 888 or version structure. As one specific example, in an Intel® SGX implementation embodiment, the implicit general-purpose register RDX may store the effective address of a VAX page slot, although the scope of the invention is not so limited. In one aspect, a VAX page may represent a dedicated type of version array page that is used to store version array information for write protected pages stored out of the EPC and is different form VA pages used to store version array information for invalidated pages stored out of the EPC. In other embodiments, version information may be stored in other types of pages, in other structures (e.g., protected structures in memory, protected structures on-die, etc.). The version information may help to protect against replay of the encrypted page. Alternatively, it may not be intended or desired to provide such protections against replay for a given implementation, and such version information may optionally be omitted.

In some embodiments, the execution unit, before storing the encrypted copy 887 in the location outside of the protected container memory, may optionally be operative to perform one or more security or verification checks. As shown, the execution unit may include a security check unit 883. In some embodiments, the security check unit may be operative to check or verify that a migration capable key structure 879 that has migration capable keys 880 has control over the write protected container page 808 to be stored out of the protected container memory. In some embodiments, this may also optionally include checking or verifying that the migration capable key structure has control over the version page 888 or other version storage structure which is to be used to store the version information. For example, in an Intel® SGX implementation embodiment, this may include determining that a current SGX domain control structure (SDCS), which may have migration capable SGX keys, counters, and crypto-meta data, has control over the write protected page and the VAX page, although the scope of the invention is not so limited. Alternatively, in other embodiments, such security or verification checks may optionally be omitted (e.g., may not be needed, may be performed by another instruction, etc.).

In some embodiments, the instruction may optionally explicitly specify or otherwise indicate a metadata structure 811 that is to be used to store metadata 878 for the stored out write protected page 808. In some embodiments, the instruction 851 may explicitly specify, or otherwise indicate, a register (e.g., one of the general-purpose registers 867) that is to store an effective address or other indication 884 of the metadata structure 811. As one specific example, in an Intel® SGX implementation embodiment, the instruction may indicate a (PCMD) structure, although the scope of the invention is not so limited. The execution unit, responsive to the instruction, may be operative to store metadata 878 pertaining to the stored out write protected page in the metadata structure. As shown, the execution unit may include an optional metadata storage unit 882. By way of example, the metadata storage unit may be operative to store metadata, such as, for example, a page type, read-write-execute permission status, pending status, modified status, and the like, and various combinations thereof, corresponding to the indicated page. Such metadata may potentially be used to ensure the integrity of the metadata when the page is reloaded (e.g., in a migrated protected container). Alternatively, in other embodiments, such storage of metadata may optionally be omitted (e.g., may not be needed, may be performed by another instruction, etc.).

FIG. 9 is a block diagram of an embodiment of a processor 912 that is operative to perform an embodiment of a protected container page write unprotect and encrypted page copy invalidation instruction 952. The processor includes a decode unit 954, an execution unit 955, and optionally a set of registers 967 (e.g., general-purpose registers). Unless specified, or otherwise clearly apparent, these components may optionally have some or all of the characteristics of the correspondingly named components of FIG. 6. To avoid obscuring the description, the different and/or additional characteristics will primarily be described without repeating all of the optionally common characteristics. Moreover, in some embodiments, the processor 912 may be used in the source computer system 100 of FIG. 1. Alternatively, the processor 912 may be used in a similar or different computer system.

The decode unit 954 may receive the instruction 952. In some embodiments, the instruction may be a privileged-level instruction that can only be performed at a privileged-level of execution, but not at an unprivileged or user-level of execution. In some embodiments, the instruction may indicate additional instruction specification information 974, although this is not required. For example, in an Intel® SGX implementation embodiment, the instruction may be a privileged-level ENCLS instruction, and may implicitly indicate general-purpose register EAX as having a leaf function index value of "29 h" to indicate an EPC page write unprotect operation, although the scope of the invention is not so limited. Although the instruction may be used in general ways, in one aspect such privileged software may potentially use the instruction to resolve a fault on a write protected page (e.g., following an attempted write to a write protected page), while a protected container is in operation in conjunction with live migration of the protected container.

In some embodiments, the instruction may indicate a write protected page 908 of a protected container. In some embodiments, the instruction may explicitly specify, or otherwise indicate, a register (e.g., one of the general-purpose registers 967) that is to store an effective address or other indication 975 of the write protected page 908. As one specific example, in an Intel® SGX implementation embodiment, the implicit general-purpose register RCX may store the effective address of the write protected EPC page. As shown, in some embodiments, the protected container memory 906 may optionally be in a system memory 970 coupled with the processor (e.g., in a hardware reserved portion of the system memory). Alternatively, the protected container memory 906 may optionally be one or more caches or other on-die storage of the processor. A combination of such approaches is also suitable. As one specific example, in an Intel® SGX implementation embodiment, the protected container memory may be an enclave page cache (EPC).

An execution unit 955 is coupled with the decode unit and the optional general-purpose registers 967. The execution unit, in response to the protected container page write protect instruction, may be operative to write unprotect the indicated page 908 of the protected container memory, which may either be in system memory or an on-die cache or other on-die storage. In one aspect, this may place the page in a valid and available state in which both reads and writes are permitted. In some embodiments, the execution unit may have a write unprotect unit 993 that is operative to write unprotect the page by configuring a write protection indicator 977, which corresponds to the indicated page 908, to indicate that the page is not write protected. The same types of write protection indicators mentioned above for the write protect indicator are suitable. In some embodiments, the same write protect indicator may be used for both instructions. The write unprotect instruction may perform substantially the opposite configuration of the indicator as the write protect instruction. As shown, in some embodiments, the write protection indicator may optionally be included in a protected container page security metadata structure (PSPMS) 909 that is to store metadata (e.g., security and access control metadata) for pages in the protected container memory. In an Intel® SGX implementation embodiment, the execution unit may write unprotect a write protected enclave page of an enclave page cache (EPC) by clearing a write protect (WP) bit in an enclave page cache map (EPCM) to indicate that the page as well as non-supervisory fields in the EPCM are write unprotected, although the scope of the invention is not so limited.

In some embodiments, the execution unit may optionally be operative to invalidate copies of the write protected page of the protected container memory that are outside of the protected container memory. In some embodiments, a version 989 corresponding to the write protected page 908 may be used. In some embodiments, the execution unit, in response to the instruction, may be operative to change the version corresponding to the page. As shown, the execution unit may include a version change unit 994 to change the version of the write protected page. As shown, the version may optionally be stored in a version page 988. Alternatively, another protected data structure in memory, or a protected structure on-die, may optionally be used to store the version. By way of example, the execution unit may invalidate an entry corresponding to the write protected page in a migration version array page, for example, by clearing the version in the entry, or otherwise changing the version so that it will not match.

In some embodiments, the instruction may explicitly specify, or otherwise indicate, a register (e.g., one of the general-purpose registers 967) that is to store an effective address or other indication 976 of a migration version array slot that is to have the version 989 of the write protected page to be changed or invalidated. As one specific example, in an Intel® SGX implementation embodiment, the implicit general-purpose register RDX may store the effective address of migration version array slot, although the scope of the invention is not so limited. In other embodiments, version information may be stored in other types of pages, in other structures (e.g., protected structures in memory, protected structures on-die, etc.).

Advantageously, this may help to provide additional security in that there may only be one true copy or version of the write protected page. When the write protected page becomes dirtied or modified, other copies of the write protected page may be invalidated so that the dirtied or modified copy of the page is the only true copy or version of the page. This may also help to protect against replay of the encrypted page. Alternatively, it may not be intended or desired to provide such protections for a given implementation, and such invalidation of the copies may optionally be omitted. Moreover, other ways of invalidating the copies of the pages outside of the protected container are also contemplated besides using version information.

In some embodiments, the execution unit, before invalidating the copies of the pages outside of the protected container memory optionally be operative to perform one or more security or verification checks. As shown, the execution unit may include a security check unit 983. In some embodiments, the security check unit may be operative to check or verify that the correct write protected page is invalidated. For example, the execution unit may be operative to compare the version of the page to the version of the page being invalidated to ensure that the correct version information is being cleared or otherwise changed. The instruction may optionally fail if the page is invalid or if the version does not match the value stored in the version page. Alternatively, in other embodiments, such security or verification checks may optionally be omitted (e.g., may not be needed, may be performed by another instruction, etc.).

In some embodiments, a decoder of a processor may also optionally be operative to decode a protected container version page or structure create instruction (e.g., instruction 653 in FIG. 6). In some embodiments, the protected container version page or structure create instruction may explicitly specify, or otherwise indicate, a register (e.g., a general-purpose register) that is to store an effective address or other indication of a page in a protected container memory. In some embodiments, the page may be an invalid page that is available to be used for a new page. The processor may also include an execution unit that may be operative, in response to the instruction, to create a version page or structure to hold version information. In some embodiments, the version page may be created in the protected container memory at the indicated page in a protected container memory (e.g., at the indicated effective address). In some embodiments, this may include zeroing out the page. In some embodiments, the version page may be a special type of page dedicated to storing version information for pages for which encrypted copies were stored out of the protected container memory but the pages remain stored in the protected container memory in a valid and readable state. In some embodiments, the created page may be an empty page into which version information may subsequently be stored (e.g., by a different instruction). In some embodiments, the execution unit responsive to the instruction may also initialize or configure one or more entries, fields, or other portions of a protected container page metadata structure (PCPMS), such as, for example, an EPCM. By way of example, this may include indicating that the page is a version type of page, setting the page to valid, and configuring read-write-execute permissions for the page.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figures 11A, 11B:
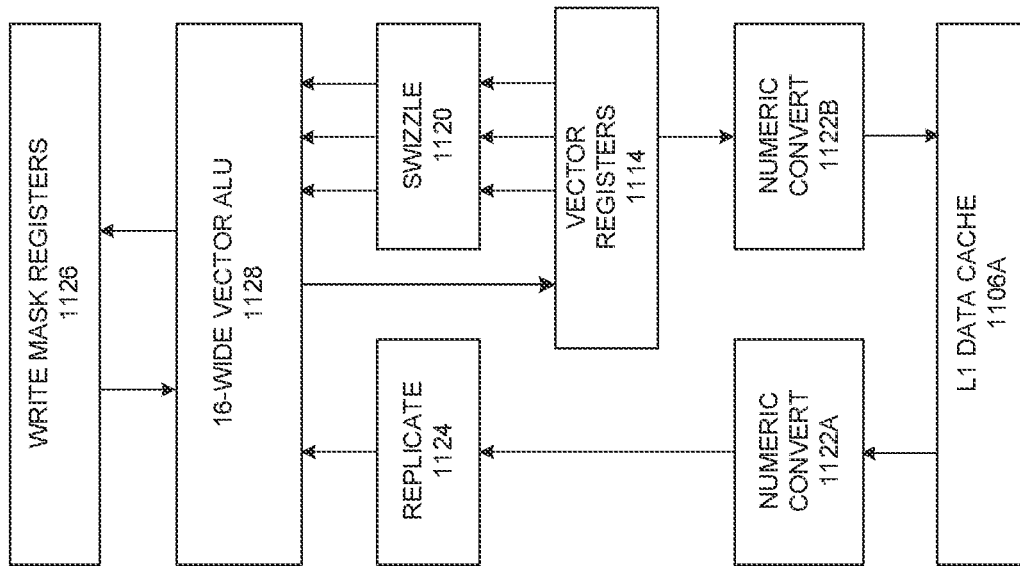
FIG. 11A is a block diagram of an embodiment of a single processor core, along with its connection to the on-die interconnect network, and with its local subset of the Level 2 (L2) cache.
FIG. 11B is a block diagram of an embodiment of an expanded view of part of the processor core of FIG. 11A.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 11112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
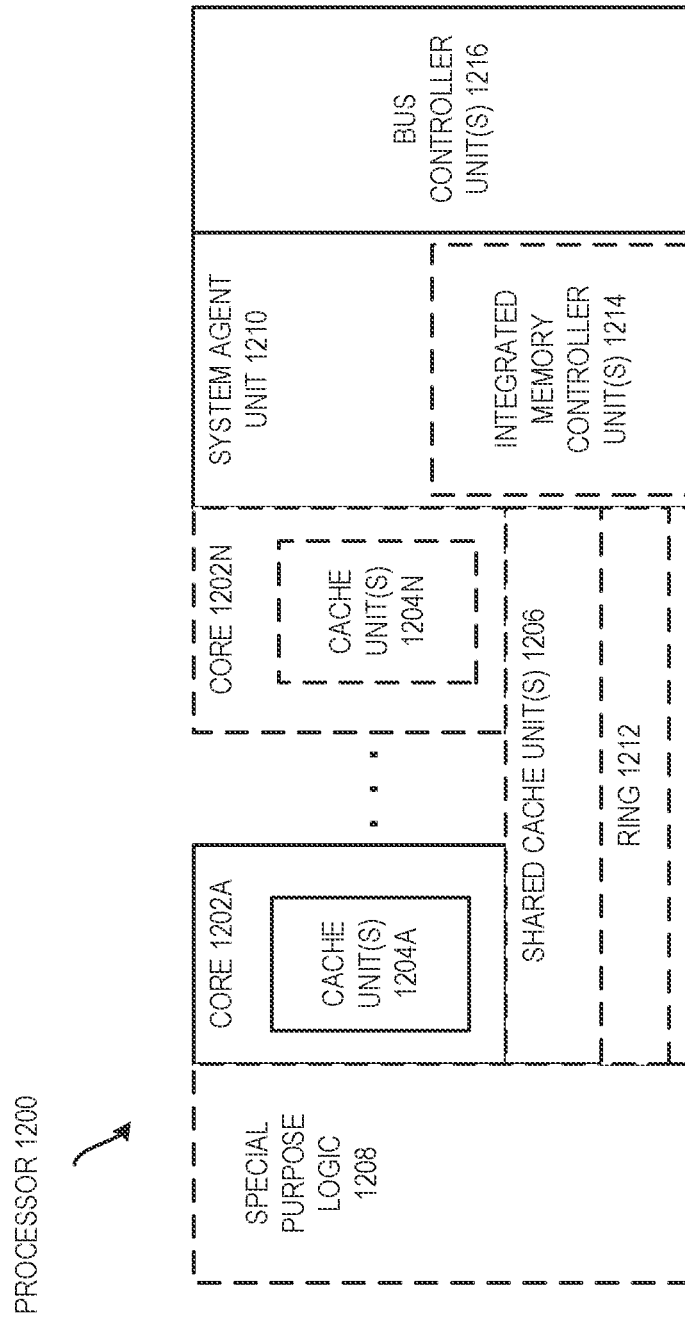
FIG. 12 is a block diagram of an embodiment of a processor that may have more than one core, may have an integrated memory controller, and may have integrated graphics.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
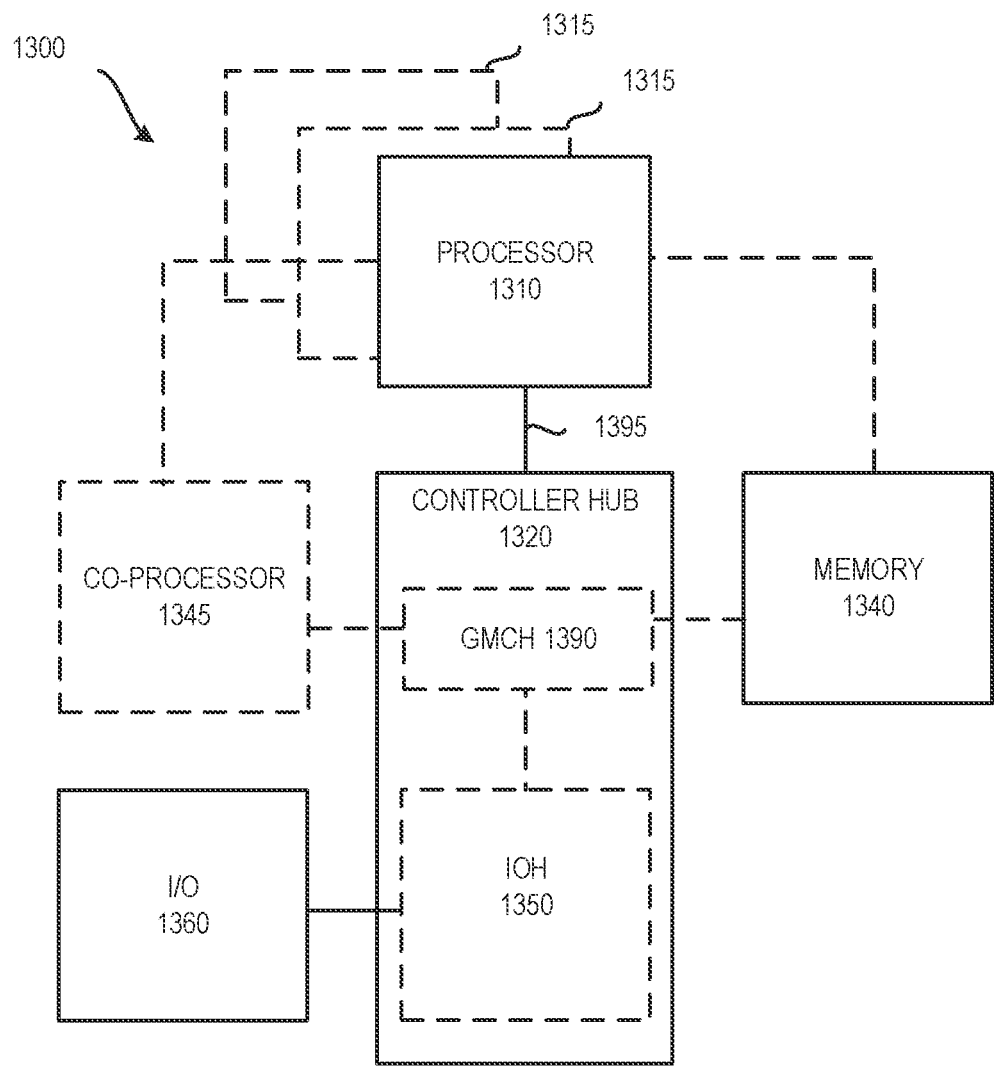
FIG. 13 is a block diagram of a first embodiment of a computer architecture.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
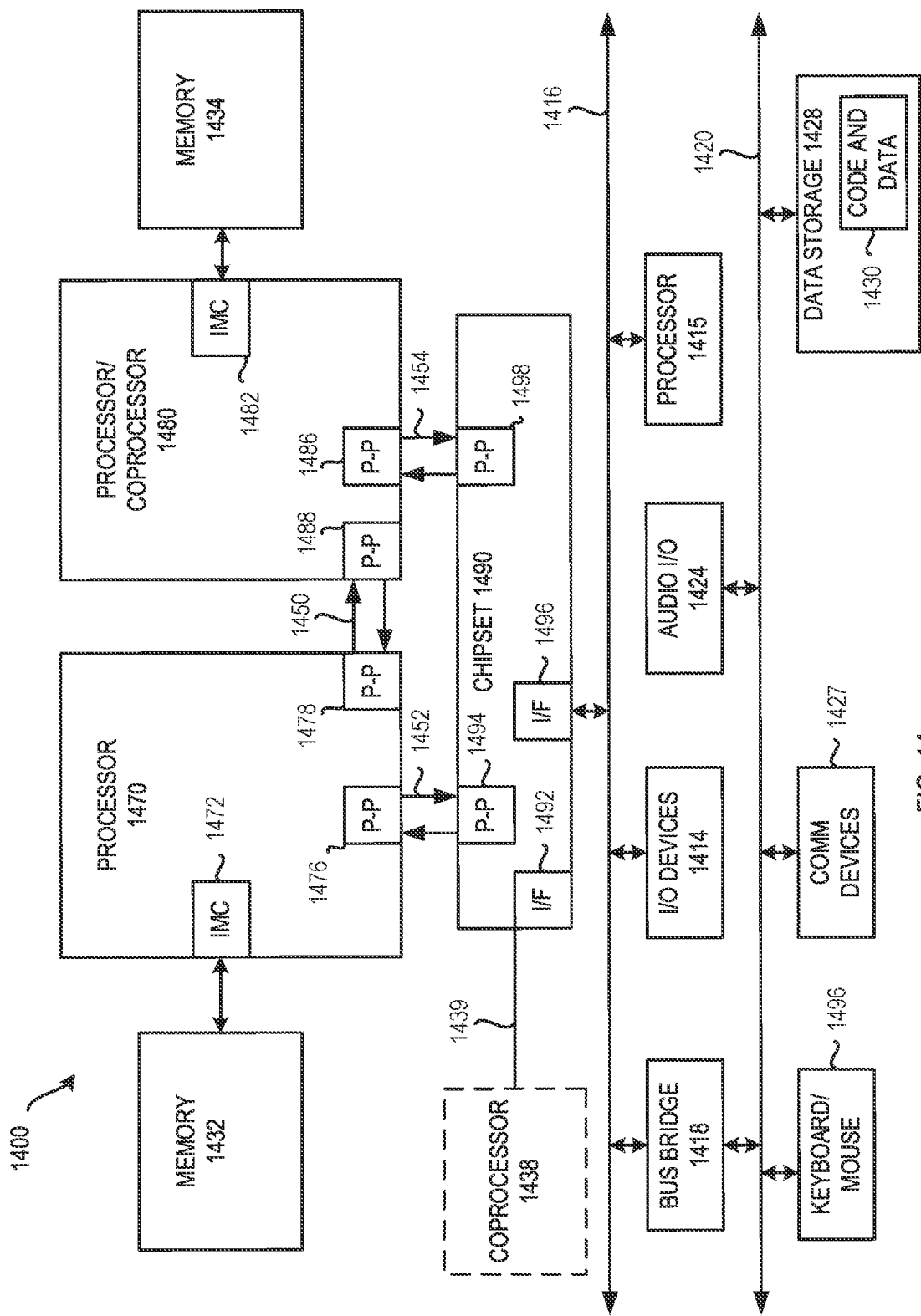
FIG. 14 is a block diagram of a second embodiment of a computer architecture.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
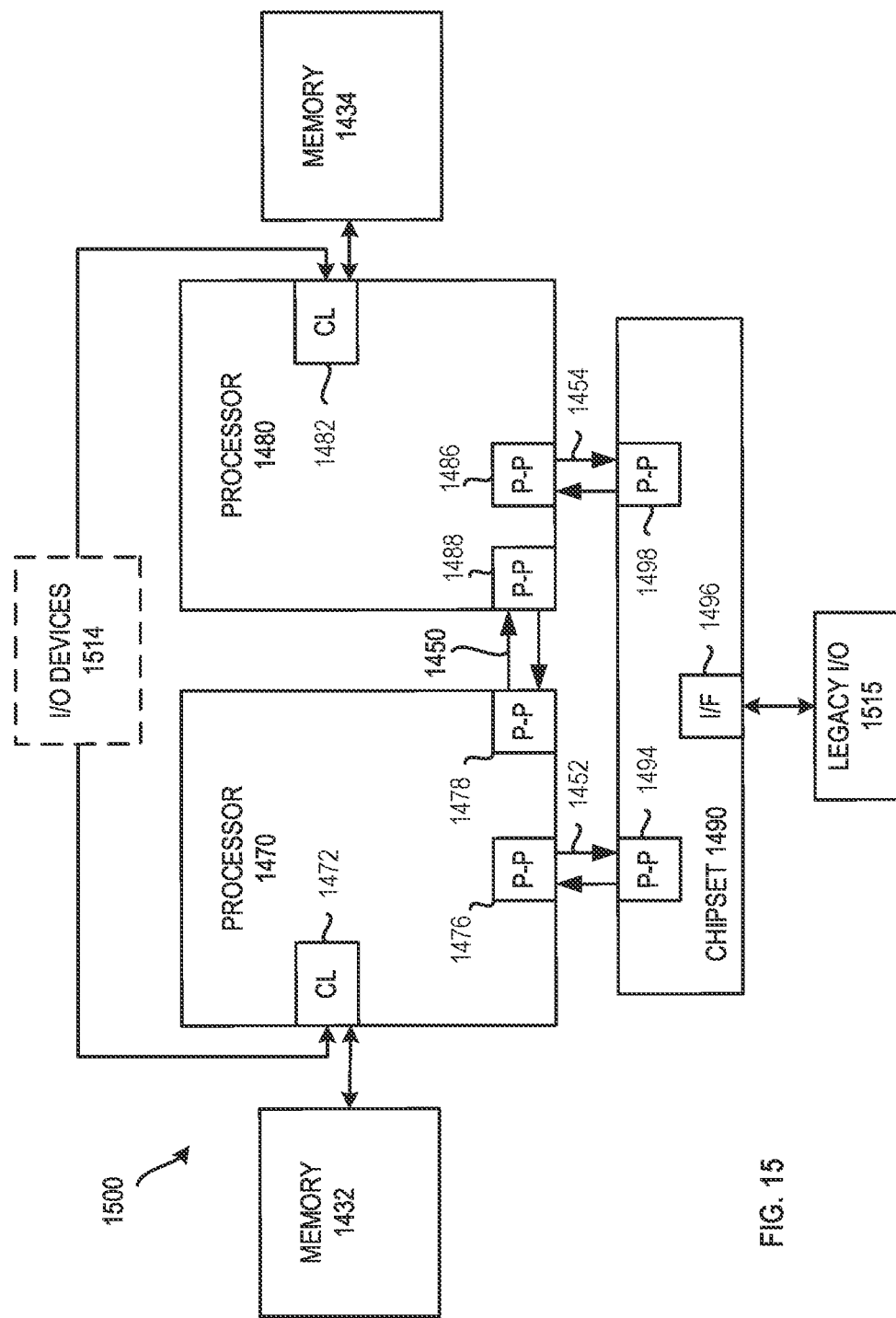
FIG. 15 is a block diagram of a third embodiment of a computer architecture.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
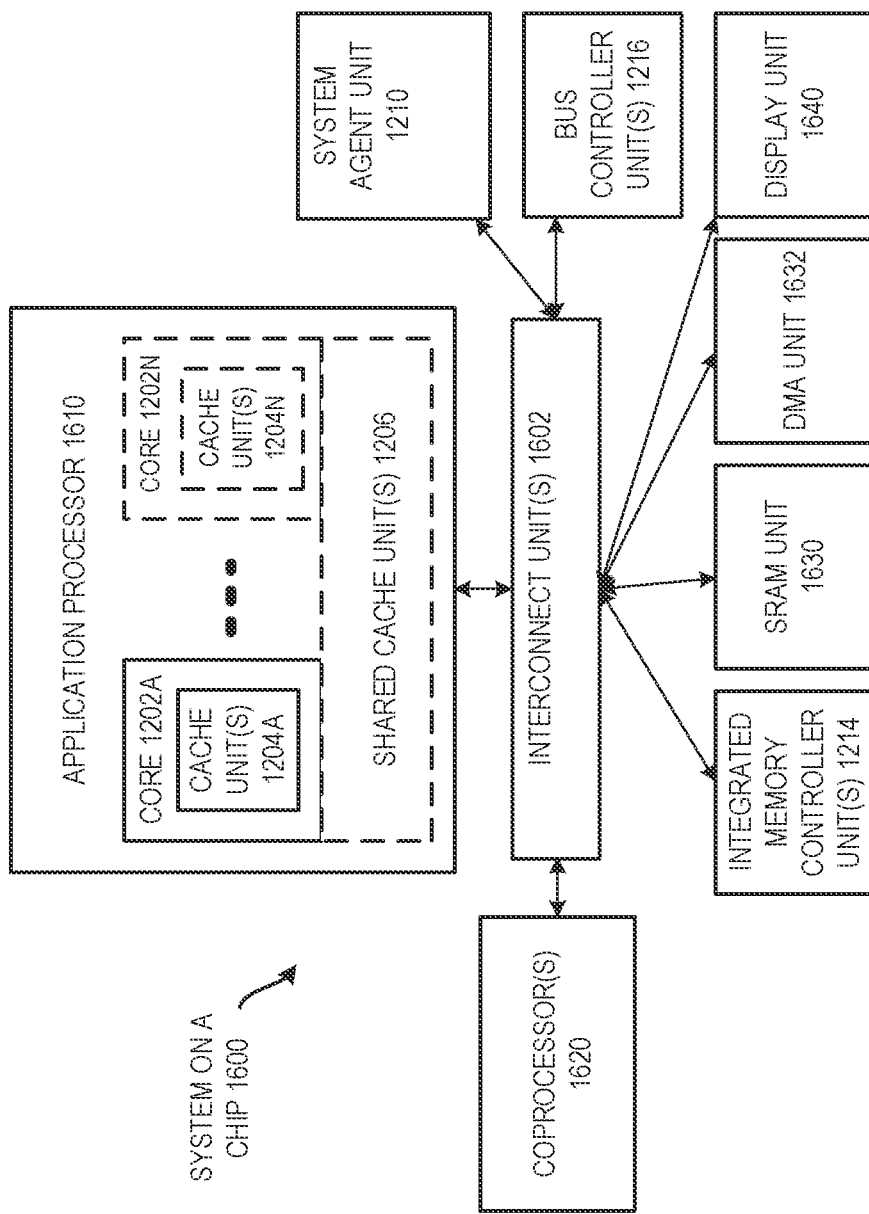
FIG. 16 is a block diagram of a fourth embodiment of a computer architecture.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 152A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
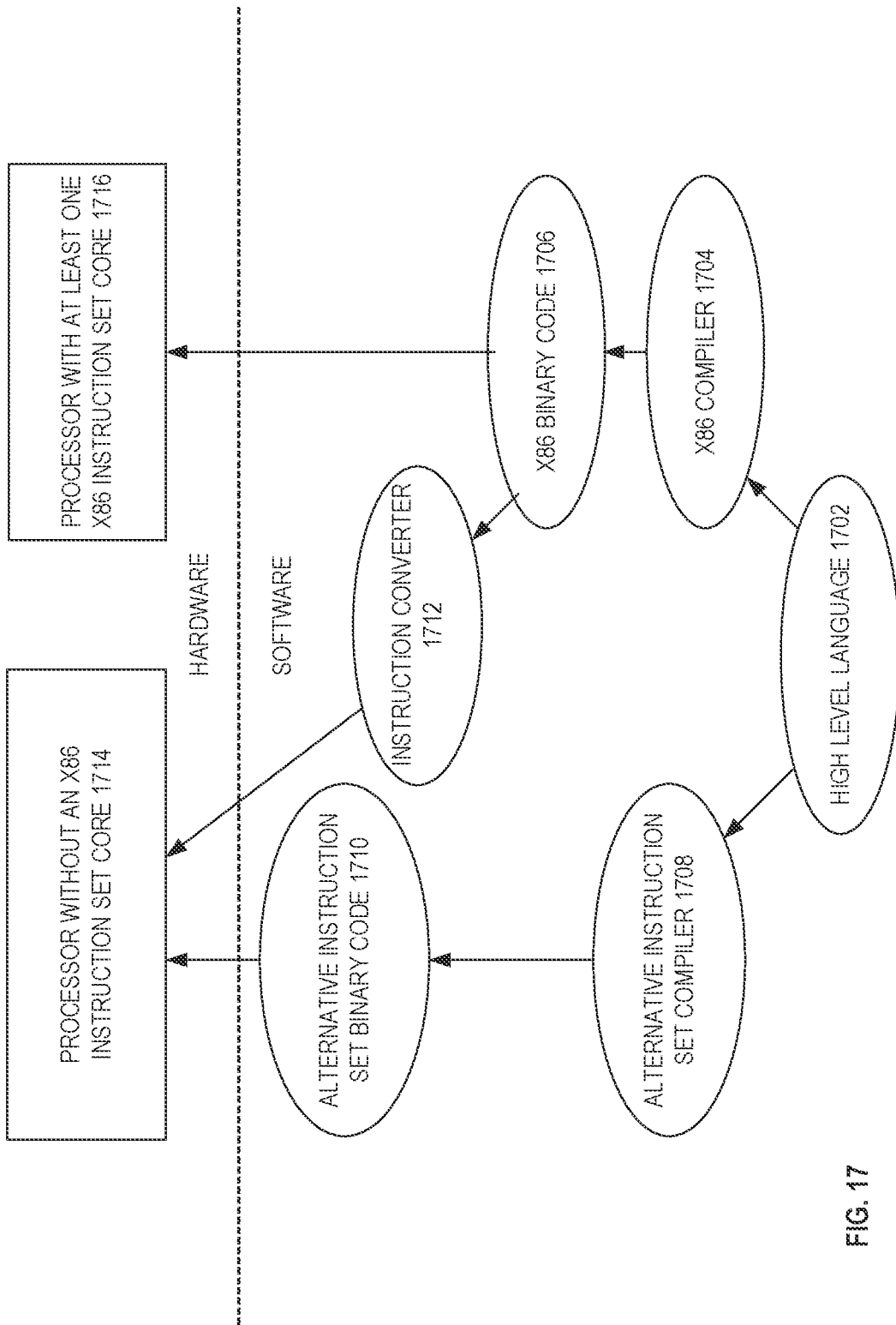
FIG. 17 is a block diagram of use of a software instruction converter to convert binary instructions in a source instruction set to binary instructions in a target instruction set, according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Components, features, and details described for any of FIGS. 5-6 may also optionally apply to any of FIGS. 7-9. Moreover, components, features, and details described for any of the apparatus may also optionally apply to any of the methods, which in embodiments may be performed by and/or with such apparatus. Any of the processors described herein may be included in any of the computer systems disclosed herein (e.g., FIGS. 13-16). In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a decode unit to decode an instruction. The instruction is to indicate a page of a protected container memory, and is to indicate a storage location outside of the protected container memory. The processor also includes an execution unit coupled with the decode unit. The execution unit, in response to the instruction, is to ensure that no writable permissions for the page of the protected container memory are cached in the processor, while the page of the protected container memory has a write protected state. The execution unit is also to encrypt a copy of the page of the protected container memory. The execution unit is further to store the encrypted copy of the page to the indicated storage location outside of the protected container memory, after it has been ensured that there are no writable references to the page of the protected container memory. The execution unit is also to leave the page of the protected container memory in the write protected state, which is also to be valid and readable, after the encrypted copy of the page has been stored to the indicated storage location outside of the protected container memory.

Example 2 includes the processor of Example 1, in which the decode unit is to decode the instruction which is to indicate the page of the protected container memory that is already to have the write protected state.

Example 3 includes the processor of Example 1, in which the execution unit, in response to the instruction, is to write protect the indicated page of the protected container memory.

Example 4 includes the processor of Example 1, in which the decode unit is to decode the instruction which is to indicate the page of the protected container memory, which is to be in a processor reserved memory, and the instruction is to indicate the storage location which is to be outside of the processor reserved memory.

Example 5 includes the processor of Example 1, wherein the execution unit is to ensure that there are no writable references to the page of the protected container memory by ensuring they are removed from translation lookaside buffers.

Example 6 includes the processor of any one of Examples 1 to 5, in which the execution unit, in response to the instruction, is to store a version of the page having the write protected state in the protected container memory.

Example 7 includes the processor of any one of Examples 1 to 5, in which the execution unit, in response to the instruction, is to determine that a migration capable key structure, which is to have one or more migration capable cryptographic keys, has control over the page of the protected container memory prior to the encrypted copy of the page being stored to the indicated storage location.

Example 8 includes the processor of any one of Examples 1 to 5, in which the decode unit is to decode the instruction which is to indicate a page metadata structure. The execution unit, in response to the instruction, is to store metadata corresponding to the indicated page in the page metadata structure. The metadata is to include a plurality of a page type, a modification status, a read permission status, a write permission status, and an execution permission status, all corresponding to the indicated page, in the page metadata structure.

Example 9 includes the processor of any one of Examples 1 to 5, in which the decode unit is to decode the instruction which is to indicate the page of the protected container memory which is to be an enclave page in an enclave page cache.

Example 10 includes the processor of any one of Examples 1 to 5, in which the decode unit is to decode the instruction which is to have an implicit general-purpose register that is to have an indication of the page of the protected container memory.

Example 11 includes the processor of any one of Examples 1 to 5, in which the decode unit is to decode the instruction which is to be a privileged-level instruction.

Example 12 is a method of performing from one to three machine instructions in a processor to perform operations including write protecting a page of a protected container memory, ensuring that no writable permissions for the page of the protected container memory are cached in the processor, and encrypt a copy of the page of the protected container memory. The operations also include storing the encrypted copy of the page of the protected container memory to a storage location that is outside of the protected container memory, after said ensuring that there are no writable references to the write protected page of the protected container memory, and leaving the write protected page of the protected container memory in a valid and readable state after said storing the encrypted copy of the page of the protected container memory to the storage location that is outside of the protected container memory.

Example 13 includes the method of Example 12, further including reading the write protected page after said storing the encrypted copy of the page to the storage location.

Example 14 includes the method of Example 12, in which said write protecting the page includes configuring a write protection indication in a protected container page metadata structure to indicate that the page is write protected, in which the protected container page metadata structure stores security metadata for the write protected page.

Example 15 includes the method of Example 14, in which said configuring the write protection indication in the protected container page metadata structure includes setting a write protect bit in an enclave page cache map.

Example 16 includes the method of Example 12, further including detecting an attempted write to the write protected page of the protected container memory, write unprotecting the page of the protected container memory, and invalidating the encrypted copy of the page stored in the storage location that is outside of the protected container memory.

Example 17 includes the method of Example 12, in which said write protecting is performed in response to performing a first of the machine instructions, and in which said encrypting, said ensuring, said storing, and said leaving are performed in response to performing a second of the machine instructions.

Example 18 is a system to process instructions that includes an interconnect, and a processor coupled with the interconnect. The processor is to receive an instruction that is to indicate a page of a protected container memory, and is to indicate a storage location outside of the protected container memory. The processor, in response to the instruction, is to ensure that there are no writable references to the page of the protected container memory, while the page of the protected container memory has a write protected state, and encrypt a copy of the page of the protected container memory. The processor is also to store the encrypted copy of the page to the indicated storage location outside of the protected container memory, after it has been ensured that there are no writable references to the page of the protected container memory, and leave the page of the protected container memory in the write protected state, which is also to be valid and readable, after the encrypted copy of the page has been stored to the indicated storage location outside of the protected container memory. The system also includes a dynamic random access memory (DRAM) coupled with the interconnect.

Example 19 includes the system of Example 18, in which the processor is to receive the instruction which is to indicate the page of the protected container memory that is already to have the write protected state.

Example 20 is an article of manufacture including a non-transitory machine-readable storage medium. The non-transitory machine-readable storage medium stores from one to three machine instructions that if executed by a machine are to cause the machine to perform operations including write protecting a page of a protected container memory, and ensuring that there are no writable references to the write protected page of the protected container memory. The operations also include, encrypting a copy of the page of the protected container memory, and storing the encrypted copy of the page of the protected container memory to a storage location that is outside of the protected container memory, after said ensuring that there are no writable references to the write protected page of the protected container memory. The operations also include leaving the write protected page of the protected container memory in a valid and readable state after said storing the encrypted copy of the page of the protected container memory to the storage location that is outside of the protected container memory.

Example 21 includes the article of manufacture of Example 18, in which the non-transitory machine-readable storage medium further stores from one to two machine instructions that if executed by a machine are to cause the machine to perform operations including write unprotecting the page of the protected container memory after detecting an attempted write to the write protected page of the protected container memory, and invalidating the encrypted copy of the page stored in the storage location that is outside of the protected container memory.

Example 22 is a processor that includes a decode unit to decode a protected container page write protect instruction. The instruction is to indicate a page of a protected container memory. The processor also includes an execution unit coupled with the decode unit. The execution unit, in response to the protected container page write protect instruction, is to write protect the indicated page of the protected container memory.

Example 23 includes the processor of Example 22, in which the execution unit is to write protect the indicated page by configuration of a write protection indicator, which corresponds to the indicated page, in a protected container page metadata structure that is to store metadata for the indicated page.

Example 24 includes the processor of Example 23, in which the execution unit is to write protect the indicated page by configuration of a write protect bit in an enclave page cache map.

Example 25 includes the processor of any one of Examples 22 to 24, in which the execution unit, in response to the instruction, is to determine that a migration capable key structure, which is to have one or more migration capable cryptographic keys, has control over the page of the protected container memory prior to the page being write protected.

Example 26 includes the processor of any one of Examples 22 to 24, in which the decode unit is to decode the instruction which is to have an implicit register that is to have an effective address of the page of the hardware enforced protected container memory.

Example 27 is a processor that includes a decode unit to decode a protected container page write unprotect and copy invalidation instruction. The instruction is to indicate a page of a protected container memory. The processor also includes an execution unit coupled with the decode unit. The execution unit, in response to the instruction, is to write unprotect the indicated page of the protected container memory, and invalidate any copies of the page of the protected container memory which are to be outside of the protected container memory.

Example 28 includes the processor of Example 27, in which the decode unit is to decode the instruction that is to indicate version information, and in which the execution unit is to invalidate said any copies of the page by changing the indicated version information.

Example 29 includes the processor of Example 28, in which version information is to be stored in the protected container memory.

Example 30 includes the processor of any one of Examples 27 to 29, in which the execution unit, in response to the instruction, is to write unprotect the indicated page by configuration of the write protection indicator in a protected container page metadata structure that is to store security metadata for pages of the protected container memory.

Example 31 includes the processor of any one of Examples 1 to 11, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 32 is a processor or other apparatus to perform or operative to perform the method of any one of Examples 12 to 17.

Example 33 is a processor or other apparatus that includes means for performing the method of any one of Examples 12 to 17.

Example 34 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 12 to 17.

Example 35 is a processor or other apparatus substantially as described herein.

Example 36 is a processor or other apparatus that is operative to perform any method substantially as described herein.

Example 37 is a processor or other apparatus to perform (e.g., that has components to perform or that is operative to perform) any instruction substantially as described herein.

Example 38 is a computer system or other electronic device that includes a processor having a decode unit to decode instructions of a first instruction set. The processor also has one or more execution units. The electronic device also includes a storage device coupled with the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when performed by the processor, are to cause the processor to emulate the first instruction.

What is claimed is:

1. A system on a chip comprising:
one or more caches;
a decode unit to decode an instruction;
a cryptographic unit, as a result of the instruction, to:
  decrypt a copy of a page with a first cryptographic key, the page to be within an encrypted portion of a virtual machine, wherein the system on a chip is to protect the page within the encrypted portion of the virtual machine from being disclosed to a virtual machine monitor; and
  generate an encrypted page based on the decrypted copy of the page with a second, different cryptographic key;
a memory controller, as a result of the instruction, to store the encrypted page generated by the cryptographic unit to a memory location outside of the encrypted portion of the virtual machine; and
a circuit to access a metadata structure, as a result of the instruction, to store metadata associated with the encrypted page in the metadata structure,
wherein the system on a chip is to leave the page within the encrypted portion of the virtual machine valid and readable after the encrypted page has been stored to the memory location outside of the encrypted portion of the virtual machine.

2. The system on a chip of claim 1, wherein the metadata structure is to have different entities for different corresponding pages of the virtual machine, and wherein the circuit is to store the metadata in an entry of the metadata structure corresponding to the page.

3. The system on a chip of claim 1, wherein the circuit to store the metadata in the metadata structure is to store information to indicate whether the page is valid or invalid, information to indicate an address through which the page is allowed to be accessed, and information to indicate read, write, and execute permissions for the page.

4. The system on a chip of claim 3, wherein the circuit to store the metadata in the metadata structure is to store information to indicate a page type of the page.

5. The system on a chip of claim 1, wherein the decode unit is to decode the instruction that implicitly indicates a register, the register to indicate additional instruction specification information.

6. The system on a chip of claim 1, wherein the system on a chip is to perform message authentication code computations based on the copy of the page as a result of the instruction, and wherein the second cryptographic key is one of a plurality of cryptographic keys capable of being migrated from a source computer system to a destination computer system.

7. The system on a chip of claim 1, further comprising a circuit to access a control structure as a result of the instruction to obtain the second cryptographic key, the control structure to store a plurality of cryptographic keys including the second cryptographic key that are capable of being migrated from a source computer system to a destination computer system.

8. A system on a chip comprising:
one or more caches;
a cryptographic unit, to perform operations corresponding to a binary code, including to:
decrypt a copy of a page with a first cryptographic key, the page to be within an encrypted portion of a virtual machine, wherein the system on a chip is to protect the page within the encrypted portion of the virtual machine from being disclosed to a virtual machine monitor; and
generate an encrypted page based on the decrypted copy of the page with a second, different cryptographic key;
a memory controller, due to the binary code, to store the encrypted page generated by the cryptographic unit to a memory location outside of the encrypted portion of the virtual machine; and
a circuit, due to the binary code, to access a metadata structure to store metadata associated with the encrypted page in the metadata structure,
wherein the system on a chip is to leave the page within the encrypted portion of the virtual machine valid and readable after the encrypted page has been stored to the memory location outside of the encrypted portion of the virtual machine.

9. The system on a chip of claim 8, wherein the circuit to store the metadata in the metadata structure is to store information to indicate whether the page is valid or invalid, information to indicate an address through which the page is allowed to be accessed, and information to indicate read, write, and execute permissions for the page.

10. The system on a chip of claim 9, wherein the circuit to store the metadata in the metadata structure is to store information to indicate a page type of the page.

11. The system on a chip of claim 8, wherein the metadata structure is to have different entities for different corresponding pages of the virtual machine, and wherein the circuit is to store the metadata in in an entry of the metadata structure corresponding to the page.

12. The system on a chip of claim 8, wherein the binary code is associated with a register, the register to indicate additional specification information corresponding to the binary code.

13. The system on a chip of claim 8, wherein the system on a chip is to perform message authentication code computations based on the copy of the page due to the binary code, and wherein the second cryptographic key is one of a plurality of cryptographic keys capable of being migrated from a source computer system to a destination computer system.

14. The system on a chip of claim 8, further comprising a circuit, due to the binary code, to access a control structure to obtain the second cryptographic key, the control structure to store a plurality of cryptographic keys including the second cryptographic key that are capable of being migrated from a source computer system to a destination computer system.

15. A system on a chip having support for an operation to generate an encrypted page based on a page within an encrypted portion of a virtual machine and store the generated encrypted page to a memory location outside of the encrypted portion of the virtual machine, the system on a chip comprising:
one or more caches;
a decode unit to decode instructions;
a cryptographic unit, controlled as part of the operation, to:
decrypt a copy of the page with a first cryptographic key, the page to be within the encrypted portion of the virtual machine, wherein the system on a chip is to protect the page within the encrypted portion of the virtual machine from being disclosed to a virtual machine monitor; and
said generate the encrypted page based on the decrypted copy of the page with a second, different cryptographic key;
a memory controller, controlled as part of the operation, to said store the encrypted page generated by the cryptographic unit to the memory location outside of the encrypted portion of the virtual machine; and
circuitry, controlled as part of the operation, to store metadata associated with the encrypted page in a metadata structure,
wherein the system on a chip is to leave the page within the encrypted portion of the virtual machine valid and readable after the encrypted page has been stored to the memory location outside of the encrypted portion of the virtual machine.

16. The system on a chip of claim 15, wherein the circuitry to store the metadata in the metadata structure is to store information to indicate whether the page is valid or invalid, information to indicate an address through which the page is allowed to be accessed, and information to indicate read, write, and execute permissions for the page.

17. The system on a chip of claim 16, wherein the circuitry to store the metadata in the metadata structure is to store information to indicate a page type of the page.

18. The system on a chip of claim 15, wherein the metadata structure is to have different entities for different corresponding pages of the virtual machine, and wherein the circuitry is to store the metadata in in an entry of the metadata structure corresponding to the page.

19. The system on a chip of claim 15, wherein the encrypted page is to be stored to the memory location outside of the encrypted portion of the virtual machine as part of a migration of the virtual machine from a source computer system to a destination computer system.

20. The system on a chip of claim 15, wherein the system on a chip, controlled as part of the operation, is to perform message authentication code computations based on the copy of the page, and wherein the second cryptographic key is one of a plurality of cryptographic keys capable of being migrated from a source computer system to a destination computer system.

21. The system on a chip of claim 15, further comprising circuitry, controlled as part of the operation, to access a control structure to obtain the second cryptographic key, the control structure to store a plurality of cryptographic keys including the second cryptographic key that are capable of being migrated from a source computer system to a destination computer system.

* * * * *